(12) United States Patent
Nakahori

(10) Patent No.: US 9,859,799 B2
(45) Date of Patent: Jan. 2, 2018

(54) SWITCHING POWER SUPPLY UNIT

(71) Applicant: TDK CORPORATION, Tokyo (JP)

(72) Inventor: Wataru Nakahori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/412,611

(22) Filed: Jan. 23, 2017

(65) Prior Publication Data

US 2017/0222562 A1    Aug. 3, 2017

(30) Foreign Application Priority Data

Feb. 2, 2016   (JP) .................................. 2016-017858

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 2001/0054* (2013.01)

(58) Field of Classification Search
CPC ............... H02M 3/33507; H02M 1/08; H02M 2001/0054
See application file for complete search history.

(56) References Cited

U.S. PATENT DOCUMENTS

| 4,586,118 | A | * | 4/1986 | Mihalka | H02M 3/3376 363/17 |
|---|---|---|---|---|---|
| 5,065,301 | A | * | 11/1991 | Shioya | H02M 3/3376 333/175 |
| 6,483,723 | B2 | * | 11/2002 | Kuranuki | H02M 1/34 363/132 |
| 7,746,670 | B2 | * | 6/2010 | Kawasaki | H02M 3/33576 363/20 |
| 8,780,585 | B2 | | 7/2014 | Ye | |
| 9,240,723 | B2 | * | 1/2016 | Boysen | H02M 3/3376 |
| 2009/0196072 | A1 | | 8/2009 | Ye | |
| 2011/0096581 | A1 | * | 4/2011 | Hailak | H02M 1/34 363/132 |
| 2011/0254528 | A1 | * | 10/2011 | Danesh-Pajooh-Nejad | H02M 3/33584 323/311 |

* cited by examiner

*Primary Examiner* — Jue Zhang
(74) *Attorney, Agent, or Firm* — Oliff PLC

(57) ABSTRACT

A switching power supply unit includes an N-number (N: an integer of 2 or greater) of transformers; an N-number of inverter circuits; a rectifying smoothing circuit including a {2×(N+1)}-number of rectifying devices, a choke coil, and a capacitor; an additional winding disposed to be interlinked with each of magnetic paths formed in the N-number of transformers; and a driver. In the rectifying smoothing circuit, a (N+1)-number of arms each have two of the rectifying devices, and are disposed in parallel to one another between the pair of output terminals, a secondary winding in each of the N-number of transformers is coupled between adjacent ones of the (N+1)-number of arms to individually form an H-bridge coupling, and the additional winding is coupled in series to one or more of the secondary windings in the N-number of transformers.

10 Claims, 19 Drawing Sheets

SWITCHING POWER SUPPLY UNIT

CROSS REFERENCE TO RELATED APPLICATIONS

This application claims the benefit of Japanese Priority Patent Application JP2016-017858 filed on Feb. 2, 2016, the entire contents of which are incorporated herein by reference.

BACKGROUND

The technology relates to a switching power supply unit that performs voltage conversion with use of switching devices.

As some examples of a switching power supply unit, various DC-DC converters have been proposed and put into practical use (for example, refer to United States Unexamined Patent Application Publication No. 2009/0196072 and U.S. Pat. No. 8,780,585). A DC-DC converter used for this purpose generally includes a switching circuit (an inverter circuit) including switching devices, a power conversion transformer (or a transformer element), and a rectifying smoothing circuit.

SUMMARY

In a switching power supply unit such as the DC-DC converter, enhancement in power conversion efficiency has been pursued in general.

It is desirable to provide a switching power supply unit that makes it possible to facilitate enhancement in power conversion efficiency.

A switching power supply unit according to an illustrative embodiment of the technology includes: a pair of input terminals that receives an input voltage; a pair of output terminals that outputs an output voltage;

an N-number of transformers each having a primary winding and a secondary winding, where N is an integer of 2 or greater; an N-number of inverter circuits each including a switching device, and disposed in parallel to one another between the primary winding and the pair of input terminals; a rectifying smoothing circuit including a $\{2 \times (N+1)\}$-number of rectifying devices, a choke coil, and a capacitor disposed between the pair of output terminals, the rectifying smoothing circuit being disposed between the secondary winding and the pair of output terminals; an additional winding disposed to be interlinked with each of magnetic paths formed in the N-number of transformers; and a driver that performs a switching drive to control operation of the switching devices in the N-number of inverter circuits. In the rectifying smoothing circuit, a (N+1)-number of arms each have two of the rectifying devices disposed in series to one another in a same direction, and are disposed in parallel to one another between the pair of output terminals, the secondary winding in each of the N-number of transformers is coupled between adjacent ones of the (N+1)-number of arms to individually form an H-bridge coupling, and the additional winding is coupled in series to one or more of the secondary windings in the N-number of transformers, and the choke coil is disposed between the (N+1)-number of arms and the capacitor.

DETAILED DESCRIPTION

In the following, some embodiments of the technology are described in detail with reference to the accompanying drawings. It is to be noted that the description is given in the following order.

1. Embodiment (an example in which two inverter circuits and two transformers are provided)
2. Modification Examples Modification Example 1 (an example in which an additional winding is coupled in series to both of two secondary windings)

Modification Example 2 (an example in which each winding is selectively wound around a middle leg of a magnetic core of a transformer)

Modification Example 3 (an example in which capacitors that prevent biased excitation are provided in a switching circuit)

Modification Example 4 (an example in which rectifying devices serving as reverse voltage clamps are provided in a switching circuit)

Modification Example 5 (another example of a configuration of a choke coil in a rectifying smoothing circuit)

3. Other Modification Examples

[1. Embodiment]

[Configuration]

Figure 1:
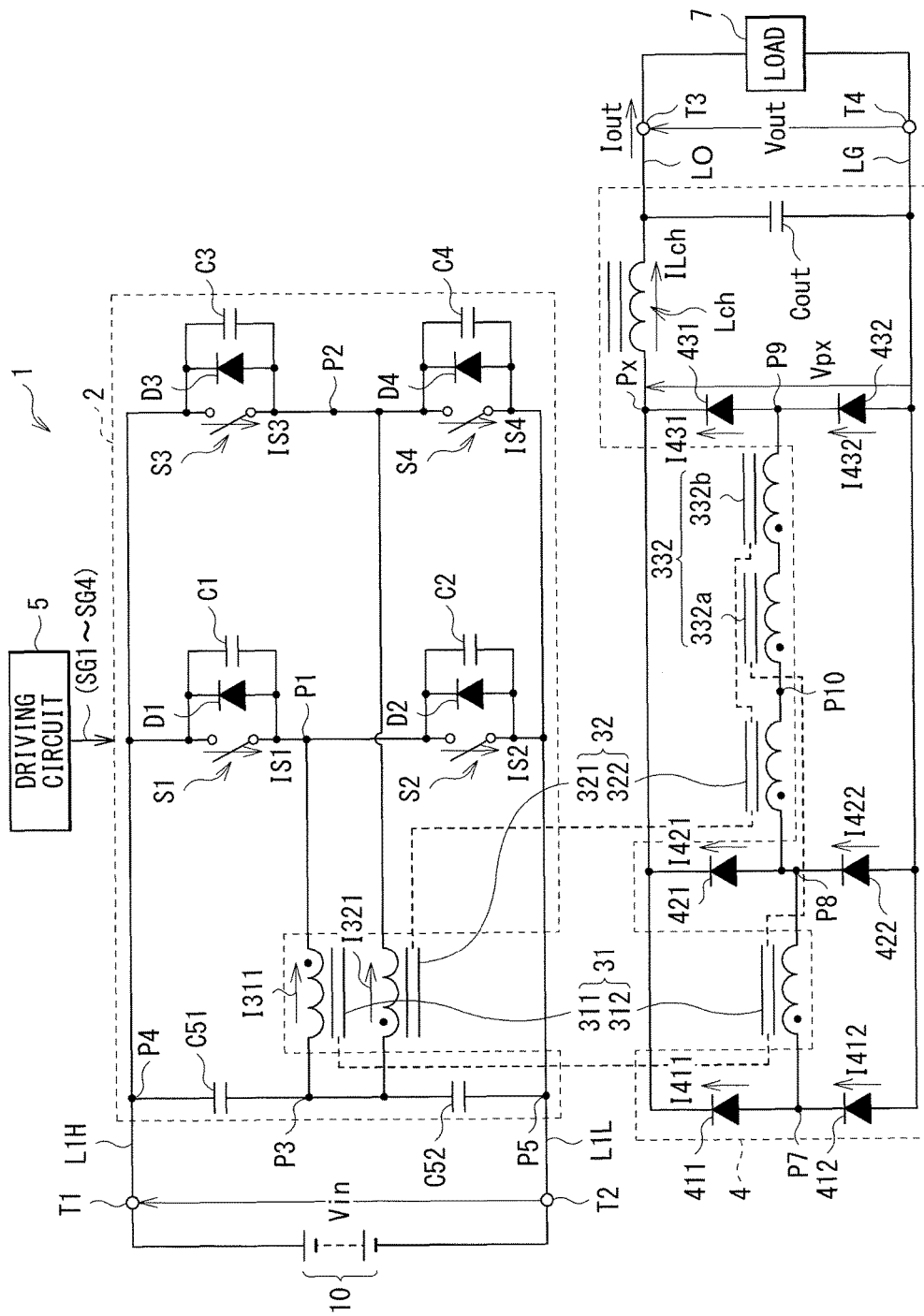
FIG. 1 is a circuit diagram of an example of an overall configuration of a switching power supply unit according to an embodiment of the technology.

FIG. 1 illustrates, in a form of a circuit diagram, an example of an overall configuration of a switching power supply unit (a switching power supply unit 1) according to an embodiment of the technology. The switching power supply unit 1 may function as a DC-DC converter that performs voltage conversion of a direct-current input voltage Vin supplied from a battery 10 (a first battery) to a direct-current output voltage Vout, and supplies the direct-current output voltage Vout to an undepicted second battery to drive a load 7. Here, the voltage conversion in the switching power supply unit 1 may take either form of up-conversion (voltage boosting) or down-conversion (voltage dropping).

It is to be noted that the direct-current input voltage Vin corresponds to one specific but non-limiting example of an "input voltage" of one embodiment of the technology, and the direct-current output voltage Vout corresponds to one specific but non-limiting example of an "output voltage" of one embodiment of the technology.

The switching power supply unit 1 includes two input terminals T1 and T2, two output terminals T3 and T4, a switching circuit 2, two transformers 31 and 32, a rectifying smoothing circuit 4, and a driving circuit 5. The direct-current input voltage Vin may be inputted to between the input terminals T1 and T2. The direct-current output voltage Vout may be outputted from between the output terminals T3 and T4.

Here, the input terminals T1 and T2 correspond to one specific but non-limiting example of a "pair of input terminals" of one embodiment of the technology, and the output terminals T3 and T4 correspond to one specific but non-limiting example of a "pair of output terminals" of one embodiment of the technology.

It is to be noted that, in the switching power supply unit 1, an input smoothing capacitor Cin may be disposed between a primary high-voltage line L1H and a primary low-voltage line L1L. The primary high-voltage line L1H may be coupled to the input terminal T1, while the primary low-voltage line L1L may be coupled to the input terminal T2. Specifically, a first end of the input smoothing capacitor Cin may be coupled to the primary high-voltage line L1H, and a second end of the input smoothing capacitor Cin may be coupled to the primary low-voltage line L1L. The input smoothing capacitor Cin may be a capacitor adapted to smooth the direct-current input voltage Vin inputted from the input terminals T1 and T2. It is to be noted that in the example of the circuit configuration illustrated in FIG. 1, two capacitors C51 and C52 inside the switching circuit 2 to be described later may also function as input smoothing capacitors. The input smoothing capacitor Cin may therefore be eliminated in this example.

(Switching Circuit 2)

The switching circuit 2 may be disposed between the input terminals T1 and T2, and primary windings 311 and 321 in the respective transformers 31 and 32 to be described later. The switching circuit 2 may include four switching devices S1 to S4, four diodes D1 to D4, and six capacitors C1 to C4, C51, and C52, as illustrated in FIG. 1. In the switching circuit 2, the switching devices S1 and S2, the switching devices S3 and S4, and the capacitors C51 and C52 may be disposed in parallel to one another between the input terminals T1 and T2, as illustrated in FIG. 1.

Figure 2:
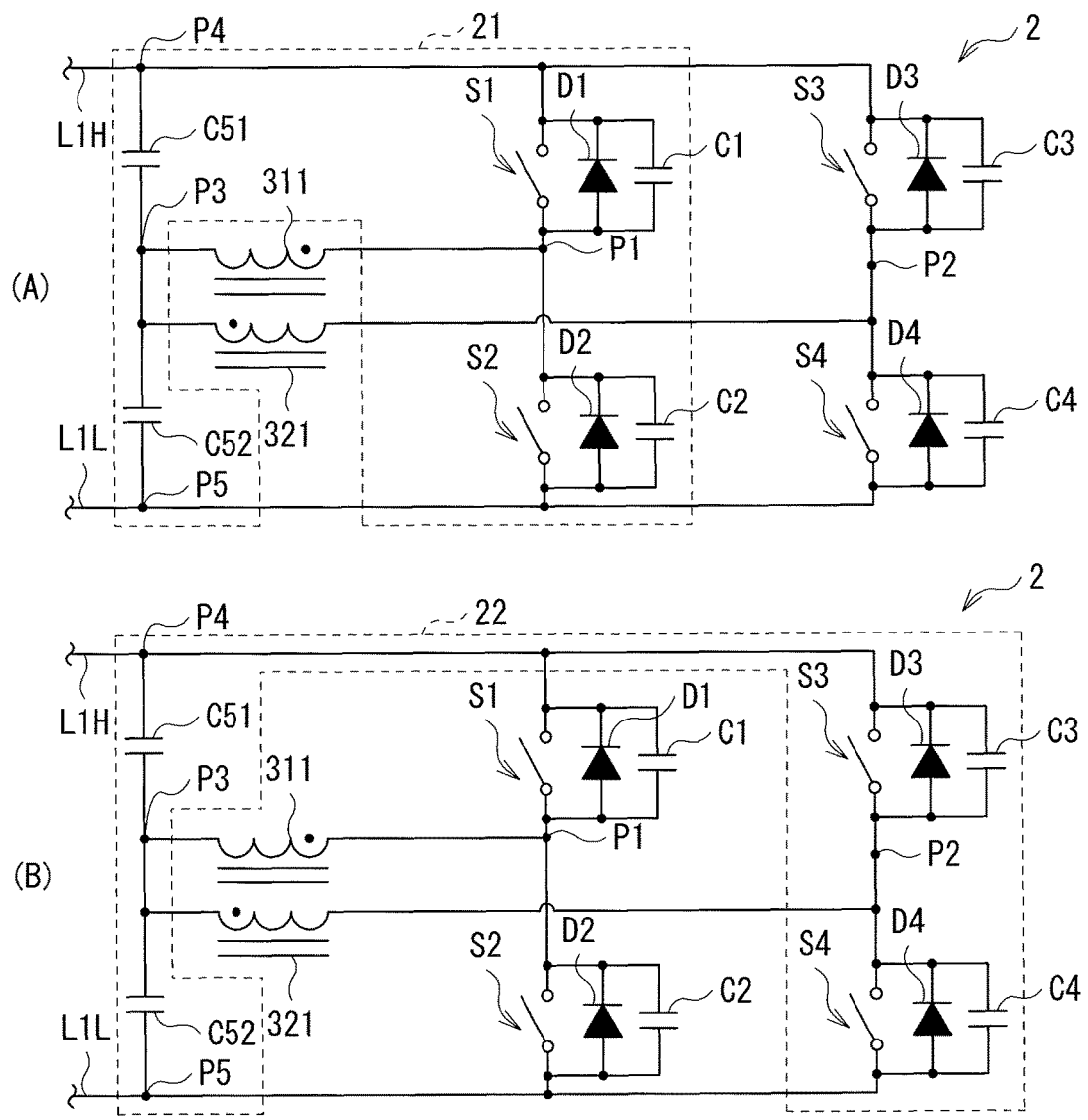
FIG. 2 is a circuit diagram of an example of a detailed configuration of a switching circuit illustrated in FIG. 1.

FIG. 2 illustrates an example of a detailed configuration of the switching circuit 2, in a form of a circuit diagram. The switching circuit 2 includes two inverter circuits (bridge circuits), as illustrated in (A) and (B) of FIG. 2. Specifically, the switching circuit 2 may include a half-bridge circuit 21 illustrated in (A) of FIG. 2 and a half-bridge circuit 22 illustrated in (B) of FIG. 2.

It is to be noted that the half-bridge circuits 21 and 22 each correspond to one specific but non-limiting example of an "inverter circuit" of one embodiment of the technology.

The half-bridge circuit 21 may include the two switching devices S1 and S2, the capacitors C1 and C2 as well as the diodes D1 and D2 coupled in parallel to the switching devices S1 and S2, respectively, and the two capacitors C51 and C52, as illustrated in (A) of FIG. 2. The half-bridge circuit 22 may include the two switching devices S3 and S4, the capacitors C3 and C4 as well as the diodes D3 and D4 coupled in parallel to the switching devices S3 and S4, respectively, and the two capacitors C51 and C52, as illustrated in (B) of FIG. 2. In other words, the capacitors C51 and C52 serve as devices shared between the two half-bridge circuits 21 and 22. It is to be noted that the diodes D1 to D4 each may include a cathode disposed on primary high-voltage line L1H side, and an anode disposed on primary low-voltage line L1L side. In other words, the diodes D1 to D4 may be in a backward-coupled state.

In the half-bridge circuit 21, first ends of the switching devices S1 and S2, first ends of the capacitors C1 and C2, the anode of the diode D1, and the cathode of the diode D2 may be coupled together at a connection point P1, as illustrated in (A) of FIG. 2. First ends of the capacitors C51 and C52 may be coupled together at a connection point P3. A second end of the switching device S1, a second end of the capacitor C1, the cathode of the diode D1, and a second end of the capacitor C51 may be coupled together at a connection point P4 on the primary high-voltage line L1H. A second end of the switching device S2, a second end of the capacitor C2, the anode of the diode D2, and a second end of the capacitor C52 may be coupled together at a connection point P5 on the primary low-voltage line L1L. The primary winding 311 of the transformer 31 to be described later may be inserted between the connection points P1 and P3. With this configuration, in the half-bridge circuit 21, the switching devices S1 and S2 may be respectively turned on and off in accordance with drive signals SG1 and SG2 supplied from the driving circuit 5 to be described later. This allows the direct-current input voltage Vin applied to between the input terminals T1 and T2 to be converted to an alternating-current voltage, and the alternating-current voltage thus converted may be outputted to the transformer 31.

In the half-bridge circuit 22, first ends of the switching devices S3 and S4, first ends of the capacitors C3 and C4, the anode of the diode D3, and the cathode of the diode D4 may be coupled together at a connection point P2, as illustrated in (B) of FIG. 2. A second end of the switching device S3, a second end of the capacitor C3, the cathode of the diode D3, and the second end of the capacitor C51 may be coupled together at the connection point P4. A second end of the switching device S4, a second end of the capacitor C4, the anode of the diode D4, and the second end of the capacitor C52 may be coupled together at the connection point P5. The primary winding 321 of the transformer 32 to be described later may be inserted between the connection points P3 and P2. With this configuration, in the half-bridge circuit 22 as well, the switching devices S3 and S4 may be respectively turned on and off in accordance with drive signals SG3 and SG4 supplied from the driving circuit 5 to be described later. This allows the direct-current input voltage Vin to be converted to an alternating-current voltage, and the alternating-current voltage thus converted may be outputted to the transformer 32.

Here, examples of switching devices used as the switching devices S1 to S4 may include field effect transistors (MOS-FETs or Metal Oxide Semiconductor-Field Effect Transistors) and IGBTs (Insulated Gate Bipolar Transistors). With MOS-FETs used as the switching devices S1 to S4, the capacitors C1 to C4 and the diodes D1 to D4 may be configured of parasitic capacitances and parasitic diodes of the respective MOS-FETs. In another alternative, the capacitors C1 to C4 may be configured of junction capacitances of the respective diodes D1 to D4. Such configurations make it unnecessary to provide the capacitors C1 to C4 and the diodes D1 to D4 separately from the switching devices S1 to S4. This allows for simplification of the circuit configuration of the switching circuit 2 (the half-bridge circuits 21 and 22).
(Transformers 31 and 32 and Additional Winding 332)

The transformer 31 includes the primary winding 311 and a secondary winding 312 magnetically coupled to one another, as illustrated in FIG. 1. The primary winding 311 may include a first end coupled to the first connection point P3, and a second end coupled to the connection point P1. The secondary winding 312 may include a first end coupled to a connection point P7 inside the rectifying smoothing circuit 4 to be described later, and a second end coupled to a connection point P8 inside the rectifying smoothing circuit 4. It is to be noted that, in FIG. 1, a winding start position of each of the primary winding 311 and the secondary winding 312 is indicated with a black circle mark ("●"), and this holds true for the following description. The transformer 31 may perform voltage conversion of the alternating-current voltage generated by the half-bridge circuit 21 (i.e., the alternating-current voltage inputted to the transformer 31), and output the alternating-current voltage thus voltage-converted, from an end of the secondary winding 312. It is to be noted that a degree of the voltage conversion in this case may be determined by a turn ratio (=Np1/Ns1) between a number-of-winding-turns Np1 in the primary winding 311 and a number-of-winding-turns Ns1 in the secondary winding 312.

Similarly, the transformer 32 includes the primary winding 321 and a secondary winding 322 magnetically coupled to one another, as illustrated in FIG. 1. The primary winding 321 may include a first end coupled to the connection point P3, and a second end coupled to the connection point P2. The secondary winding 322 may include a first end coupled to the connection point P8 inside the rectifying smoothing circuit 4 to be described later, and a second end coupled to a connection point P10 inside the rectifying smoothing circuit 4. It is to be noted that, in FIG. 1, a winding start position of each of the primary winding 321 and the secondary winding 322 is indicated with a black circle mark, and this holds true for the following description. The transformer 32 may perform voltage conversion of the alternating-current voltage generated by the half-bridge circuit 22 (i.e., the alternating-current voltage inputted to the transformer 32), and output the alternating-current voltage thus voltage-converted, from an end of the secondary winding 322. It is to be noted that a degree of the voltage conversion in this case may also be determined by a turn ratio (=Np2/Ns2) of a number-of-winding-turns Np2 in the primary winding 321 and a number-of-winding-turns Ns2 in the secondary winding 322.

Here, in the present embodiment, as represented by the following Expression (1), the turn ratio (=Np1/Ns1) of the number-of-winding-turns Np1 in the primary winding 311 and the number-of-winding-turns Ns1 in the secondary winding 312 in the transformer 31, and the turn ratio (=Np2/Ns2) of the number-of-winding-turns Np2 in the primary winding 321 and the number-of-winding-turns Ns2 in the secondary winding 322 in the transformer 32, may be equal to one another.

$$(Np1/Ns1)=(Np2/Ns2) \qquad (1)$$

The additional winding 332 may be a winding coupled in series to one or both of the secondary windings 312 and 322 (in this example, the secondary winding 322) in the transformers 31 and 32, as illustrated in FIG. 1. As described later in detail (FIG. 9 to FIG. 11), the additional winding 332 may be disposed to be interlinked with each of magnetic paths (magnetic paths B1 and B2 to be described later) formed in the transformers 31 and 32. In addition, the additional winding 332 may include an additional winding 332a and an additional winding 332b, in an equivalent circuit, as illustrated in FIG. 1. The additional winding 332a may be magnetically coupled to one (the secondary winding 312) of the secondary windings 312 and 322, whereas the additional winding 332b may be magnetically coupled to the other (the secondary winding 322). The additional windings 332a and 332b may be coupled in series to one another to form the entire additional winding 332.

It is to be noted that, of the additional windings 332a and 332b, the additional winding 332a corresponds to one specific but non-limiting example of a "first additional winding" of one embodiment of the technology. The additional winding 332b corresponds to one specific but non-limiting example of a "second additional winding" of one embodiment of the technology.

Figure 3:
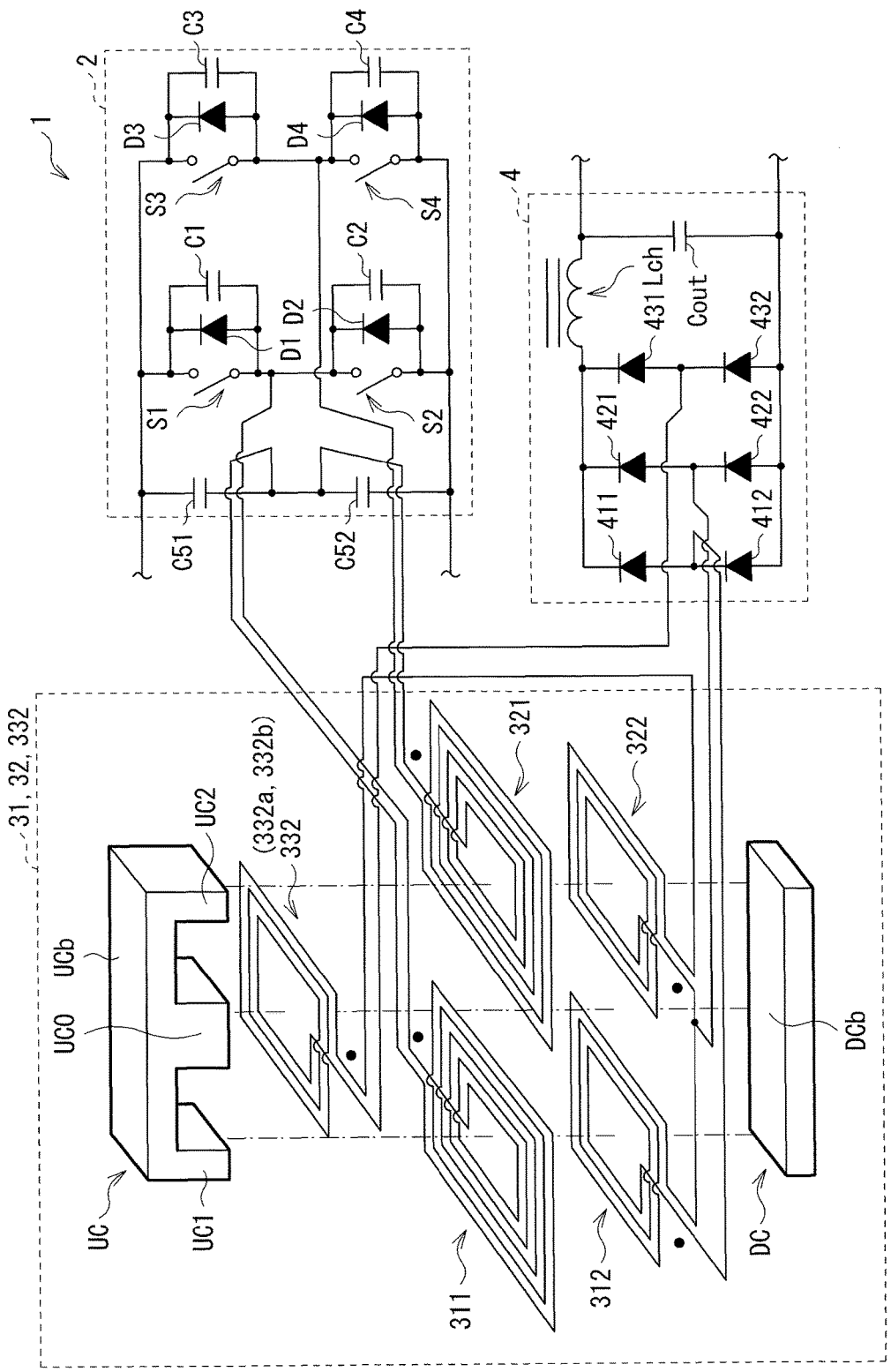
FIG. 3 is a schematic diagram of an example of a detailed configuration of components including transformers illustrated in FIG. 1.

Here, FIG. 3 schematically illustrates, in an exploded perspective view, an example of detailed configurations of the transformers 31 and 32 and the additional winding 332, together with circuit configurations of the switching circuit 2 and the rectifying smoothing circuit 4 illustrated in FIG. 1. It is to be noted that FIG. 3 illustrates the two additional windings 332a and 332b collectively as the additional winding 332 for convenience. This also applies to subsequent figures.

In this example, the two transformers 31 and 32 may be included in a single magnetic device, as illustrated in FIG. 3. Specifically, the single magnetic device may have a core member (a magnetic core) and the above-described windings (the primary windings 311 and 321, the secondary windings 312 and 322, and the additional winding 332). The core member may include an upper core UC and a lower core DC disposed to face one another. It is to be noted that each of these windings may be configured of, for example, a printed coil or a sheet metal (a plate-like member) made of a conductive material such as copper (Cu) and aluminum (Al). In addition, the upper core UC and the lower core DC may each be made of, for example, a magnetic material such as ferrite.

In this example, the magnetic core including the upper core UC and the lower core DC may be configured of a so-called EI core (a magnetic core having an EI-type shape), as illustrated in FIG. 3. Specifically, the upper core UC may have a base core UCb and three legs (legs UC0, UC1, and UC2). The base core UCb may be extended in a horizontal direction. The legs UC0, UC1, and UC2 may be disposed in parallel with a clearance in between along an extending direction (one direction in a horizontal plane) of the base core UCb. The legs UC0, UC1, and UC2 may be extended in a vertical direction. The leg UC0 may be disposed near a center (between the legs UC1 and UC2) in the extending direction of the base core UCb to form a middle leg. The legs UC1 and UC2 may be disposed at both ends of the extending direction of the base core UCb to each form an outer leg. The legs UC1 and UC2 may form respective loop magnetic paths (the magnetic paths B1 and B2 to be described later) with the leg UC0, while sharing the leg UC0 (see FIG. 9 to FIG. 11 to be described later). The lower core DC may have a base core DCb shaped like a plate and extended in the horizontal direction.

Each of the above-described windings (the primary windings 311 and 321, the secondary windings 312 and 322, and the additional winding 332) may be wound around the magnetic core (the one EI core) including the upper core UC and the lower core DC. Specifically, in this example, the primary winding 311 and the secondary winding 312 may be wound around the leg UC1 in a horizontal plane, while being separated from one another. The primary winding 321 and the secondary winding 322 may be wound around the leg UC2 in a horizontal plane, while being separated from one another. The additional winding 332 (the additional windings 332a and 332b) may be wound around the leg UC0 in a horizontal plane.

Here, the upper core UC and the lower core DC correspond to one specific but non-limiting example of a "magnetic core" of one embodiment of the technology. In addition, the leg UC0 corresponds to one specific but non-limiting example of a "middle leg" of one embodiment of the technology, and the legs UC1 and UC2 correspond to one specific but non-limiting example of a "plurality of outer legs" of one embodiment of the technology.

(Rectifying Smoothing Circuit 4)

The rectifying smoothing circuit 4 may be provided between the secondary windings 312 and 322 in the transformers 31 and 32, and the output terminals T3 and T4, as illustrated in FIG. 1. The rectifying smoothing circuit 4 may include six rectifying diodes 411, 412, 421, 422, 431, and 432, one choke coil Lch, and one output smoothing capacitor Cout.

It is to be noted that the rectifying diodes 411, 412, 421, 422, 431, and 432 correspond to one specific but non-limiting example of "rectifying devices" of one embodiment of the technology. The output smoothing capacitor Cout corresponds to one specific but non-limiting example of a "capacitor" of one embodiment of the technology.

In the rectifying smoothing circuit 4, every two rectifying diodes may be provided in series to one another in a same orientation and form one of three arms. Specifically, the rectifying diodes 411 and 412 may form a first arm, the rectifying diodes 421 and 422 may form a second arm, and the rectifying diodes 431 and 432 may form a third arm. In addition, the first to third arms may be provided in parallel to one another between the output terminals T3 and T4. Specifically, a connection point (a connection point Px) of first ends of the first to third arms may be coupled to the output terminal T3 through the choke coil Lch and an output line LO, and a connection point of second ends of the first to third arms may be coupled to a ground line LG extended from the output terminal T4.

In the first arm, cathodes of the rectifying diodes 411 and 412 may be disposed on the first-end side of the first arm. Anodes of the rectifying diodes 411 and 412 may be disposed on the second-end side of the first arm. Specifically, the cathode of the rectifying diode 411 may be coupled to the connection point Px, the anode of the rectifying diode 411 and the cathode of the rectifying diode 412 may be coupled together at the connection point P7, and the anode of the rectifying diode 412 may be coupled to the ground line LG.

Similarly, in the second arm, cathodes of the rectifying diodes 421 and 422 may be disposed on the first-end side of the second arm. Anodes of the rectifying diodes 421 and 422 may be disposed on the second-end side of the second arm. Specifically, the cathode of the rectifying diode 421 may be coupled to the connection point Px, the anode of the rectifying diode 421 and the cathode of the rectifying diode 422 may be coupled together at the connection point P8, and the anode of the rectifying diode 422 may be coupled to the ground line LG.

Similarly, in the third arm, cathodes of the rectifying diodes 431 and 432 may be disposed on the first-end side of the third arm. Anodes of the rectifying diodes 431 and 432 may be disposed on the second-end side of the third arm. Specifically, the cathode of the rectifying diode 431 may be coupled to the connection point Px, the anode of the rectifying diode 431 and the cathode of the rectifying diode 432 may be coupled together at the connection point P9, and the anode of the rectifying diode 432 may be coupled to the ground line LG.

Moreover, the windings including the secondary windings 312 and 322 in the respective transformers 31 and 32 may be coupled between adjacent ones of the first to third arms to form an H-bridge coupling. Specifically, the secondary winding 312 of the transformer 31 may be coupled between the first arm and the second arm adjacent to one another to form the H-bridge coupling. In addition, in this example, the secondary winding 322 of the transformer 32 and the additional winding 332 may be coupled between the second arm and the third arm adjacent to one another to form the H-bridge coupling. To be more specific, as illustrated in FIG. 1, the secondary winding 312 may be inserted between the connection point P7 on the first arm and the connection point P8 on the second arm, while the secondary winding 322 and the additional winding 332 may be inserted between the connection point P8 on the second arm and the connection point P9 on the third arm. In addition, in this example, between the second arm and the third arm, the secondary winding 322 may be disposed on the second arm side (the connection point P8 side) and the additional winding 332 may be disposed on the third arm side (the connection point P9 side). Moreover, in the additional winding 332, the additional winding 332a may be disposed on the secondary winding 322 side (the connection point P10 side), and the additional winding 332b may be disposed on the third arm side (the connection point P9 side).

Between the first to third arms and the output smoothing capacitor Cout, the choke coil Lch may be disposed. Specifically, the choke coil Lch may be inserted between the connection point (the connection point Px) of the first ends in the first to third arms, and a first end of the output smoothing capacitor Cout, through the output line LO. In addition, the connection point of the second ends in the first to third arms may be coupled to a second end of the output smoothing capacitor Cout, on the ground line LG.

In the rectifying smoothing circuit 4 thus configured, in a rectifying circuit including the six rectifying diodes 411, 412, 421, 422, 431, and 432, the alternating-current voltages outputted from the transformers 31 and 32 may be rectified, and the voltages thus rectified may be outputted. Moreover, in a smoothing circuit configured of the choke coil Lch and the output smoothing capacitor Cout, the voltages rectified by the rectifying circuit may be smoothed to generate the direct-current output voltage Vout. It is to be noted that the direct-current output voltage Vout thus generated may be outputted from the output terminals T3 and T4 to the second battery (not illustrated) for electric power supply.

(Driving Circuit 5)

The driving circuit 5 may be a circuit that performs a switching drive to control operation of the switching devices S1 to S4 inside the switching circuit 2 (the half-bridge circuits 21 and 22). Specifically, the driving circuit 5 may supply the switching devices S1 to A4 with the respective drive signals SG1 to SG4, and thereby control each of the switching devices S1 to S4 to be turned on and off.

Here, in the present embodiment, the driving circuit 5 may perform the switching drive to cause the two half-bridge circuits 21 and 22 to operate with a phase difference (a phase difference φ to be described later). In other words, the driving circuit 5 may perform a switching phase control on the switching devices S1 to S4, and may set the phase difference appropriately to stabilize the direct-current output voltage Vout. Moreover, at this occasion, for example, as described in detail later, the driving circuit 5 may perform the switching drive to cause durations of on-duty periods of the switching devices S1 to S4 to be substantially maximum (or to be maximum in a preferred but non-limiting example), in the two half-bridge circuits 21 and 22. It is to be noted that the driving circuit 5 corresponds to one specific but non-limiting example of a "driver" of one embodiment of the technology.

[Operation, Workings, and Effects]

(A. Basic Operation)

In the switching power supply unit 1, in the switching circuit 2 (the half-bridge circuits 21 and 22), the direct-current input voltage Vin supplied from the input terminals T1 and T2 may be switched to generate the alternating-current voltages. The alternating-current voltages may be supplied to the primary windings 311 and 321 in the transformers 31 and 32. In the transformers 31 and 32, the alternating-current voltages may be converted. The alternating-current voltages thus converted may be outputted from the windings such as the secondary windings 312 and 322.

In the rectifying smoothing circuit 4, the alternating-current voltages outputted from the transformers 31 and 32 (i.e., the voltage-converted alternating-current voltages) may be rectified by the rectifying diodes 411, 412, 421, 422, 431, and 432. Thereafter, the alternating-current voltages thus rectified may be smoothed by the choke coils Lch and the output smoothing capacitor Cout. Thus, the direct-current output voltage Vout may be outputted from the output terminals T3 and T4. The direct-current output voltage Vout may be supplied to the undepicted second battery to be used for charging of the second battery while driving the load 7.

(B. Detailed Operation)

Next, detailed operation of the switching power supply unit 1 is described with reference to FIGS. 4 to 8.

Figure 4:
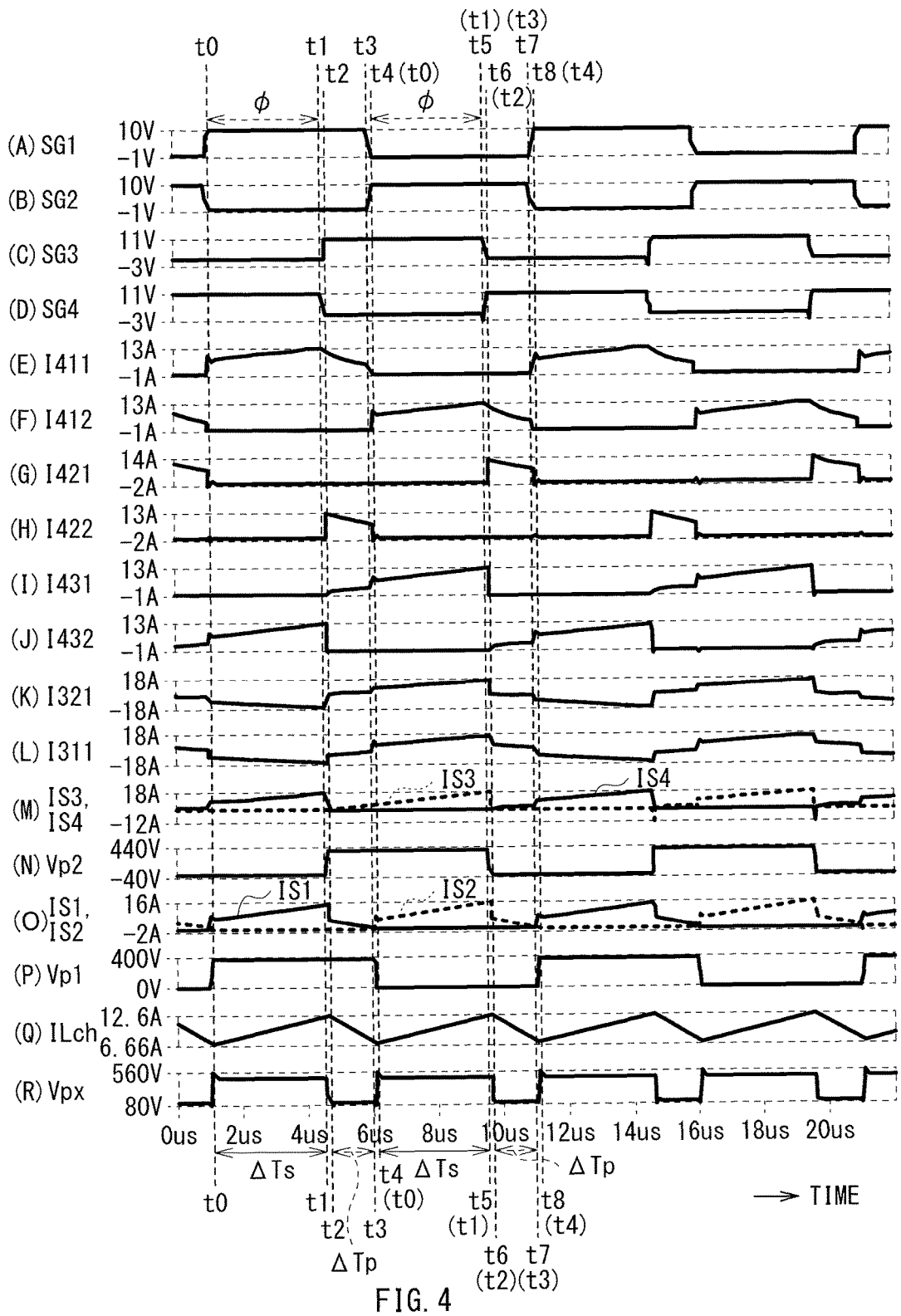
FIG. 4 is a timing waveform chart of an example of operation of the switching power supply unit illustrated in FIG. 1.

FIG. 4 illustrates, in a form of a timing waveform chart, a voltage waveform or a current waveform of each section in the switching power supply unit 1. Specifically, (A) to (D) of FIG. 4 illustrate voltage waveforms of the drive signals SG1 to SG4. (E) to (L) of FIG. 4 illustrate current waveforms of currents 1411, 1412, 1421, 1422, 1431, and 1432 flowing through the rectifying diodes 411, 412, 421, 422, 431, and 432, respectively, and current waveforms of currents 1321 and 1311 flowing through the primary windings 321 and 311, respectively, as illustrated in FIG. 1. (M) of FIG. 4 illustrates current waveforms of currents IS3 and IS4 flowing through the switching devices S3 and S4, respectively, and (O) of FIG. 4 illustrates current waveforms of currents IS1 and IS2 flowing through the switching devices S1 and S2, respectively, as illustrated in FIG. 1. (N) and (P) of FIG. 4 illustrate voltage waveforms of voltages Vp2 and Vp1 indicating a potential at the connection point P2 and a potential at the connection point P1, respectively, as illustrated in FIG. 1. (Q) of FIG. 4 illustrates a current waveform of a current ILch flowing through the choke coil Lch, as illustrated in FIG. 1. (R) of FIG. 4 illustrates a voltage waveform of a voltage VPx applied to between the connection point Px and the ground line LG mentioned above, as illustrated in FIG. 1. It is to be noted that positive directions of the voltages and the currents may be denoted by arrows in FIG. 1.

FIGS. 5 to 8 each schematically illustrate, in a form of a circuit diagram, an operation state of the switching power supply unit 1 at each of timings (timings t0 to t4) illustrated in FIG. 4. It is to be noted that in the operation as illustrated in FIG. 4, operation for the timings t0 to t4 (a first half cycle) and operation for the timings t4 to t8 (a latter half cycle) may be combined to form one-cycle operation.

(B-1. Operation for First Half Cycle)

First, the operation for the first half cycle (the timings t0 to t4) is described with reference to FIGS. 4 to 8.

As to the drive signals SG1 to SG4 of the switching devices S1 to S4 ((A) to (D) of FIG. 4), the switching devices S1 to S4 may be classified into two pairs of switching devices. Specifically, the switching devices S1 and S2 may each be controlled to be turned on at a fixed timing on a time axis, and referred to as a "phase-locked-side switching device". In addition, the switching devices S3 and S4 may each be controlled to be turned on at a variable timing on the time axis, and referred to as a "phase-shift-side switching device".

In addition, the switching devices S1 to S4 may be driven, in any state of switching operation, in a combination and at a timing where the input terminals T1 and T2 to which the direct-current input voltage Vin is applied are not electrically shortcircuited. Specifically, the switching devices S3 and S4 (the phase-shift-side switching devices) are not turned together, and the switching devices S1 and S2 (the phase-locked-side switching devices) are not turned on together as well. A time interval taken to prevent them from being turned on together may be referred to as "dead time". The two half-bridge circuits 21 and 22 (that is, the switching devices S1 and S2, and the switching devices S3 and S4) may operate with the phase difference φ, for example, as illustrated in FIG. 4. In other words, the driving circuit 5 performs the switching phase control on the switching devices S1 to S4.

(Timings t0 to t1)

First, in a period before the timing t0, the switching devices S2 and S4 may be turned on, while the switching devices S1 and S3 may be turned off ((A) to (D) of FIG. 4). Next, in a period from the timing t0 to the timing t1, first, immediately before the timing t0, the switching device S2 may be turned off ((B) of FIG. 4), and at the timing of t0, the switching device S1 may be turned on ((A) of FIG. 4).

Figure 5:
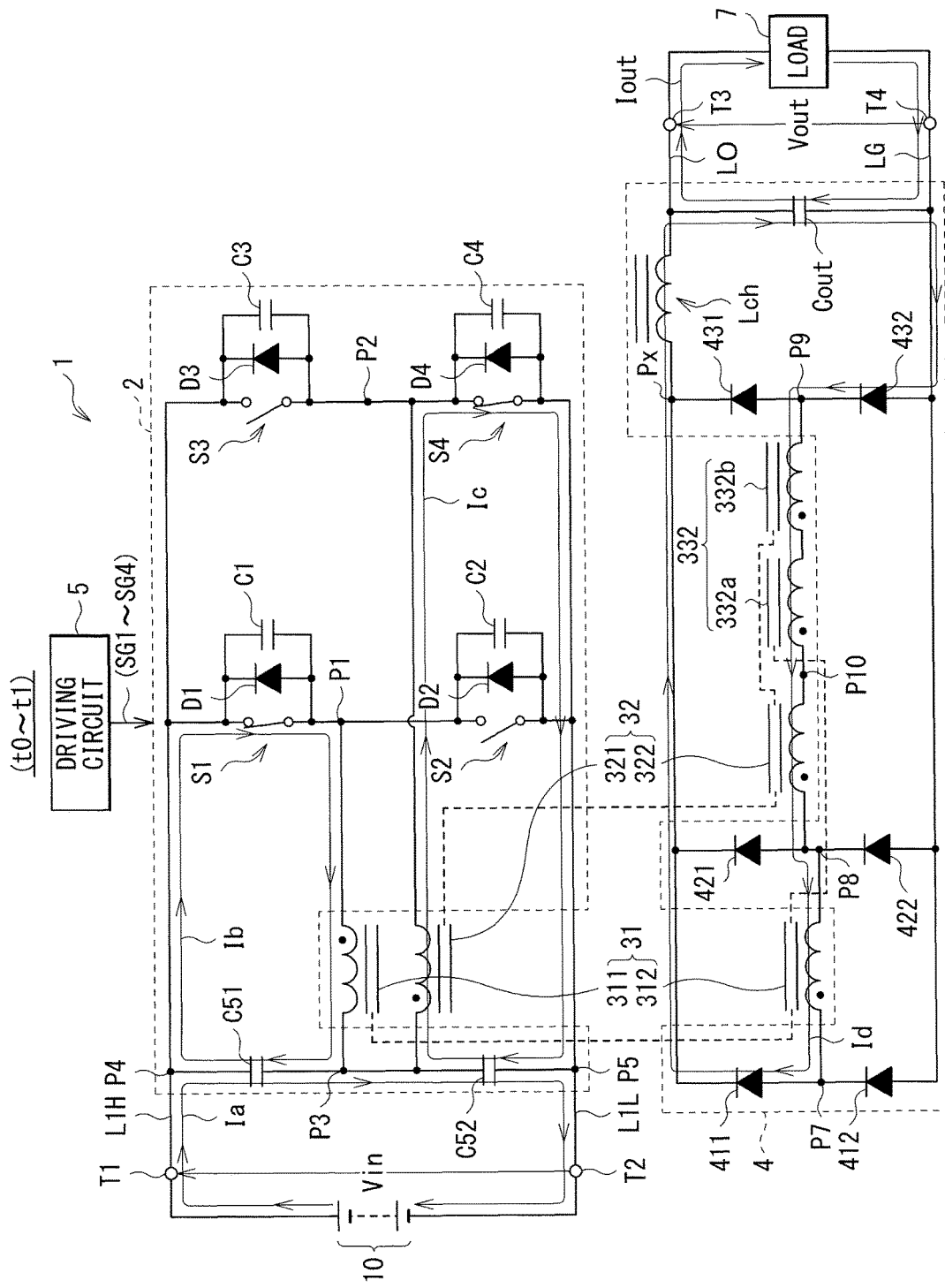
FIG. 5 is a circuit diagram of an example of an operation state of the switching power supply unit illustrated in FIG. 1.

In other words, in the period from the timing t0 to the timing t1, the switching devices S1 and S4 may be turned on, and the switching devices S2 and S3 may be turned off, as illustrated in FIG. 5. Therefore, on primary side (the switching circuit 2) of the transformers 31 and 32, loop currents Ia, Ib, and Ic may flow ((K) to (P) of FIG. 4). Specifically, the loop current Ia may flow to circulate through the battery 10, the input terminal T1, the capacitor C51, the capacitor C52, the input terminal T2, and the battery 10 in the order named. The loop current Ib may flow to circulate through the primary winding 311, the capacitor C51, the switching device S1, and the primary winding 311 in the order named. The loop current Ic may flow to circulate through the primary winding 321, the switching device S4, the capacitor C52, and the primary winding 321 in the order named.

As described, in each of the primary windings 311 and 321 of the transformers 31 and 32, excitation is caused so that a winding-start side thereof is in the positive direction, as illustrated in FIG. 5. For this reason, in each of the secondary windings 312 and 322 of the transformers 31 and 32, and the additional winding 332 (the additional windings 332a and 332b) as well, a voltage is outputted so that a winding-start side thereof is in the positive direction.

In the period from the timing t0 to the timing t1, a loop current Id and an output current Iout may therefore flow ((E) to (J), (Q), and (R) of FIG. 4), on secondary side (the rectifying smoothing circuit 4) of the transformers 31 and 32. The loop current Id may flow to circulate through the secondary winding 312, the rectifying diode 411, the choke coil Lch, the output smoothing capacitor Cout, the rectifying diode 432, the additional winding 332 (the additional windings 332a and 332b), the secondary winding 322, and the secondary winding 312 in the order named. In other words, at this occasion, the rectifying diodes 411 and 432 may each become conductive. In addition, at this occasion, the choke coil Lch may be excited by a potential difference (V312+V322+V332−Vout) between a sum of output voltages V312, V322, and V332 from the secondary windings 312 and 322 of the transformers 31 and 32 and the additional winding 332, and the direct-current output voltage Vout. It is to be noted that the output voltage V332 from the additional winding 332 may be obtained by V332=(V332a+V332b), where the output voltages from the additional windings 332a and 332b are V332a and V332b, respectively. On the other hand, the output current Iout may flow to circulate through the output smoothing capacitor Cout, the output terminal T3, the load 7, the output terminal T4, and the output smoothing capacitor Cout in the order named, thereby allowing the load 7 to be driven.

As described, the period from the timing t0 to the timing t1 may serve as a power transmission period from the primary side to the secondary side of the transformers 31 and 32, by a "serial connection state" (a serial connection mode). In other words, in the period from the timing t0 to the timing t1, the two secondary windings 312 and 322 and the additional winding 332 (the additional windings 332a and 332b) may be in a state where the secondary windings 312 and 322 and the additional windings 332a and 332b are coupled in series to one another (a four serial connection state). That is, the period from the timing t0 to the timing t1 may be a serial connection state period ΔTs in the secondary windings 312 and 322 and the additional windings 332a and 332b, as illustrated in FIG. 4.

(Timings t1 to t2)

Next, in a period from the timing t1 to the timing t2, first, the switching device S4 may be turned off at the timing t1 ((D) of FIG. 4).

Figure 6:
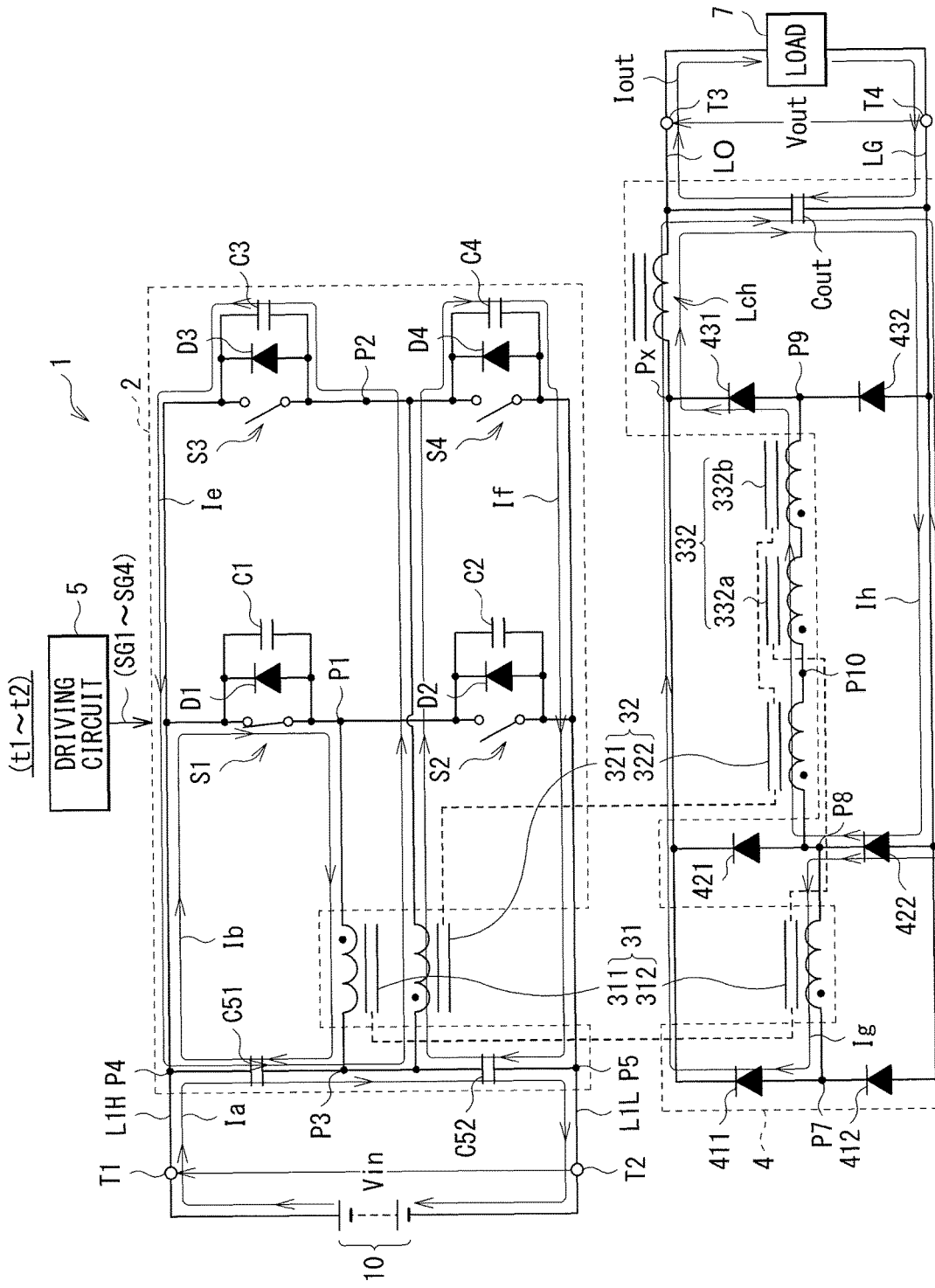
FIG. 6 is a circuit diagram of an example of an operation state following FIG. 5.

Then, as illustrated in FIG. 6, on the primary side of the transformers 31 and 32, loop currents Ie and If may flow, together with the currents Ia and Ib ((K) to (P) of FIG. 4). Specifically, the loop current Ie may flow to circulate through the primary winding 321, the capacitor C3, the capacitor C51, and the primary winding 321 in the order named. The loop current If may flow to circulate through the primary winding 321, the capacitor C4, the capacitor C52, and the primary winding 321 in the order named.

The loop currents Ie and If (that correspond to "circulating currents" to be described later) may flow owing to energy stored in a leakage inductor (not illustrated) of the transformer 32, and may flow so as to maintain a preceding current direction. In other words, the leakage inductor of the transformer 32 may work together with the capacitors C3, C4, C51, and C52 to form an LC resonance circuit whose LC resonance operation may cause such flows of the loop currents Ie and If. The loop currents Ie and If may allow the capacitor C3 to be discharged and the capacitor C4 to be charged. Hence, the energy stored in the leakage inductor of the transformer 32 may be regenerated in the capacitor C51 on the primary side.

Next, the diode D3 serving as a body diode of the switching device S3 may become conductive, upon completion of the discharge from the capacitor C3 and the charge to the capacitor C4. This causes a flow of a loop current that flows through the diode D3 instead of flowing through the switching device S3, thereby allowing regeneration in the capacitor C51. In addition, at this occasion, in the primary winding 321 of the transformer 32, a winding-end side thereof may be in the positive direction.

Subsequently, the switching device S3 may be turned on while the diode D3 is conductive as described ((C) of FIG. 4). This achieves ZVS (zero volt switching) operation, resulting in reduction in a loss (a switching loss) in the switching device S3.

Upon completion of the regeneration in the capacitor C51, the direction of the current flowing through the primary winding 321 of the transformer 32 may be reversed. Hence, in the primary winding 321, excitation begins to bring the winding-end side thereof to be in the positive direction.

In accordance with the current reverse on the primary side, the following may occur on the secondary side of the transformers 31 and 32 ((E) to (J), (Q), and (R) of FIG. 4). In accordance with reverse of the voltage applied to the primary winding 321 of the transformer 32, the output voltage V322 from the secondary winding 322 of the transformer 32 and the output voltage V332b from the additional winding 332b may also be reversed. The output voltage V322 and the output voltage V332b may be outputted so that winding-end sides of the secondary winding 322 and the additional winding 332b are in the position direction. In addition, as described in detail later, the output voltages V332a and V332b from the additional windings 332a and 332b offset one another, which causes the output voltage V332 from the entire additional winding 332 to become 0 (zero) V.

Accordingly, instead of the loop current Id mentioned above, loop currents Ig and Ih may flow on the secondary side of the transformers 31 and 32, as illustrated in FIG. 6. The loop current Ig may flow to circulate through the secondary winding 312, the rectifying diode 411, the choke coil Lch, the output smoothing capacitor Cout, the rectifying diode 422, and the secondary winding 312 in the order named. In addition, the loop current Ih may flow to circulate through the secondary winding 322, the additional winding 332 (the additional windings 332a and 332b), the rectifying diode 431, the choke coil Lch, the output smoothing capacitor Cout, the rectifying diode 422, and the secondary winding 322 in the order named. In other words, at this occasion, the rectifying diode 432 may become nonconductive, while the rectifying diodes 422 and 431 may become conductive. In addition, at this occasion, the choke coil Lch may be excited by a potential difference (V312−Vout) between the output voltage V312 from the transformer 31 and the output voltage Vout.

As described, at the timing t2, a power transmission period from the primary side to the secondary side of the transformers 31 and 32, in a "parallel connection state" (a parallel connection mode) begins. In other words, at the timing t2, the secondary windings 312 and 322 and the additional winding 332 (the additional windings 332a and 332b) may be in a state where the secondary winding 312 and the secondary winding 322, and the additional winding 332 are coupled in parallel to one another (a two parallel connection state). That is, at the timing t2, a parallel connection state period ΔTp in the secondary windings 312 and 322 and the additional winding 332 may begin, as illustrated in FIG. 4. As described, a transition may occur from the serial connection state period ΔTs (the electric power transmission period in the serial connection mode: the timing t0 to the timing t1) to the parallel connection state period ΔTp (the electric power transmission period in the parallel connection mode) at and after the timing t2 (from the timing t2 to the timing t3). It is to be noted that an occasion when the excitation begins to bring the winding-end side in the primary winding 321 of the transformer 32 to be in the positive direction as described above may correspond to the timing t2.

(Timings t2 to t3)

Figure 7:
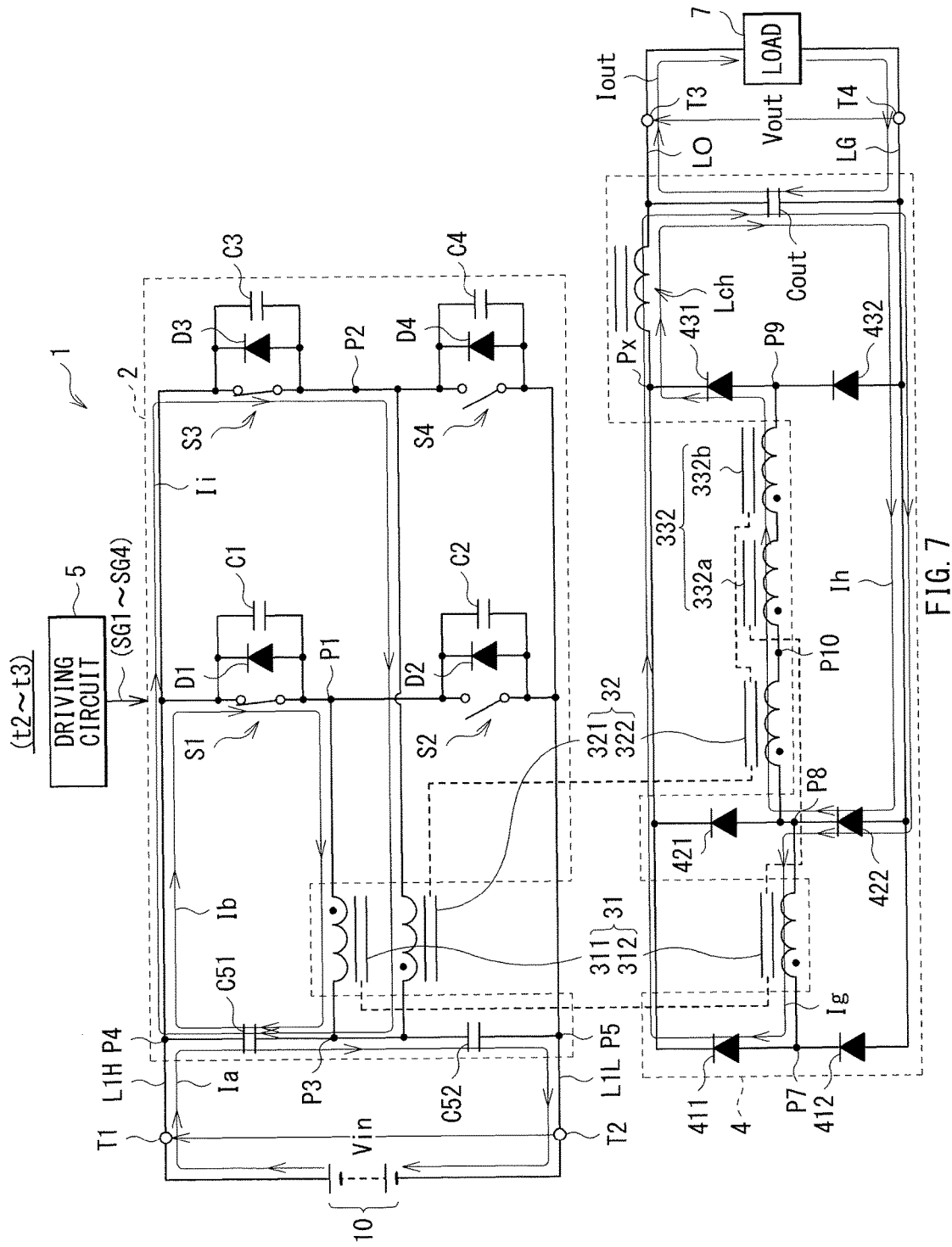
FIG. 7 is a circuit diagram of an example of an operation state following FIG. 6.

Next, as illustrated in FIG. 7, in a period from the timing t2 to the timing t3, the switching devices S1 and S3 may be turned on, and the switching devices S2 and S4 may be turned off ((A) to (D) of FIG. 4). For this reason, in the period from the timing t2 to the timing t3, a loop current Ii may flow on the primary side of the transformers 31 and 32, together with the loop currents Ia and Ib ((K) to (P) of FIG. 4). Specifically, the loop current Ii may flow to circulate through the primary winding 321, the capacitor C51, the switching device S3, and the primary winding 321 in the order named.

As described, as illustrated in FIG. 7, in the primary winding 311 of the transformer 31, excitation may be caused to bring a winding-start side thereof to be in the positive direction, whereas in the primary winding 321 of the transformer 32, excitation may be caused to bring the winding-end side thereof to be in the positive direction.

Therefore, in the secondary winding 312 of the transformer 31 as well, a voltage may be outputted to bring a winding-start side thereof to be in the positive direction, whereas in the secondary winding 322 of the transformer 32 as well, a voltage may be outputted to bring the winding-end side thereof to be in the positive direction. In addition, as described in detail later, the output voltages V332a and V332b from the additional windings 332a and 332b offset one another, which causes the output voltage V332 from the entire additional winding 332 to become 0 (zero) V.

Hence, in the period from the timing t2 to the timing t3, the loop currents Ig and Ih and the output current Iout may flow on the secondary side in the transformers 31 and 32 on the secondary side (the rectifying smoothing circuit 4) ((E) to (J), (Q), and (R) of FIG. 4).

Here, as illustrated in FIG. 4, the period from the timing t2 to the timing 3 may be the parallel connection state period ΔTp (the electric power transmission period in the parallel connection mode). Therefore, as illustrated in FIG. 7, the current flowing through the choke coil Lch may be split into the secondary winding 312 side (the loop current Ig), and the secondary windings 322 and the additional winding 332 side (the loop current Ih). In addition, a leakage inductor (not illustrated) coupled in series to the primary winding 311 of the transformer 31 may function as a current source, and therefore may tend to maintain the flowing current.

In the period from the timing t2 to the timing t3, magnitude of the loop current Ig flowing through the secondary winding 312 may therefore change as follows. First, the loop current Ig takes an initial value equal to the current flowing through the choke coil Lch, and then proportion of the loop current Ig gradually decreases, by a gradual increase in proportion of the loop current Ih flowing through the secondary windings 322 and the additional winding 332.

(Timings t3 to t4)

Next, in a period from the timing t3 to the timing t4, first, the switching device S1 may be turned on at the timing t3 ((A) of FIG. 4).

Figure 8:
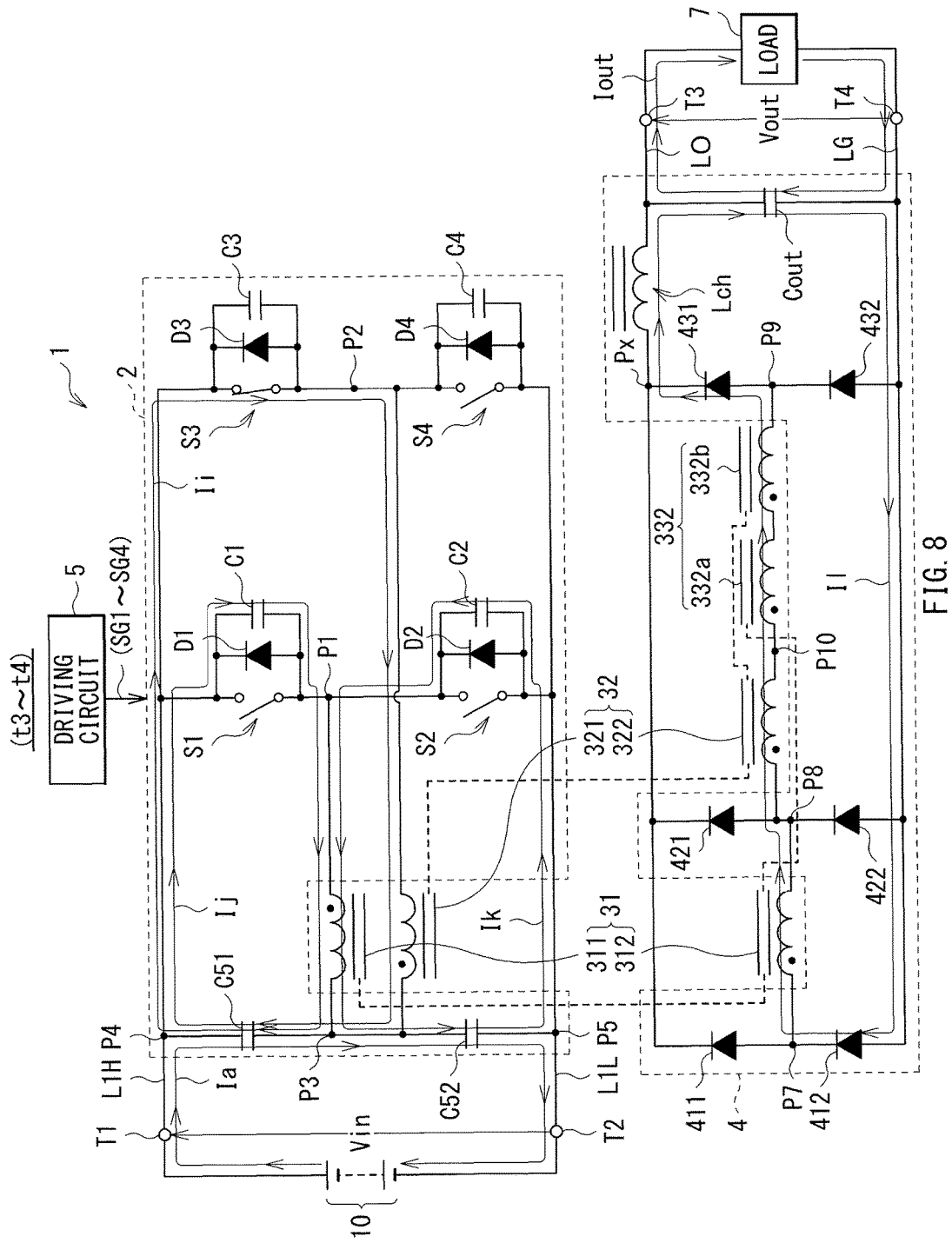
FIG. 8 is a circuit diagram of an example of an operation state following FIG. 7.

Then, as illustrated in FIG. 8, on the primary side of the transformers 31 and 32, loop currents Ij and Ik may flow, together with the loop currents Ia and Ii ((K) to (P) of FIG. 4). Specifically, the loop current Ij may flow to circulate through the primary winding 311, the capacitor C51, the capacitor C1, and the primary winding 311 in the order named. The loop current Ik may flow to circulate through the primary winding 311, the capacitor C52, the capacitor C2, and the primary winding 311 in the order named.

The loop currents Ij and Ik (that correspond to "circulating currents" to be described later) may flow owing to energy stored in the leakage inductor (not illustrated) of the transformer 31, and may flow so as to maintain a preceding current direction. In other words, the leakage inductor of the transformer 31 may work together with the capacitors C1, C2, C51, and C52 to form an LC resonance circuit whose LC resonance operation may cause such flows of the loop currents Ij and Ik. The loop currents Ij and Ik may allow the capacitor C2 to be discharged and the capacitor C1 to be charged. Hence, the energy stored in the leakage inductor of the transformer 31 may be regenerated in the capacitor C52 on the primary side.

Next, the diode D2 serving as a body diode of the switching device S2 may become conductive, upon completion of the discharge from the capacitor C2 and the charge to the capacitor C1. This causes a flow of a loop current that flows through the diode D2 instead of flowing through the switching device S2, thereby allowing regeneration in the capacitor C52. In addition, at this occasion, in the primary winding 311 of the transformer 31, a winding-end side thereof may be in the positive direction.

Subsequently, the switching device S2 may be turned on while the diode D2 is conductive as described ((B) of FIG. 4). This achieves the ZVS operation, resulting in reduction in a loss (a switching loss) in the switching device S2.

Upon completion of the regeneration in the capacitor C52, the direction of the current flowing through the primary winding 311 of the transformer 31 may be reversed. Hence, in the primary winding 311, excitation begins to bring the winding-end side thereof to be in the positive direction. It is to be noted that, in the primary winding 321 of the transformer 32, the excitation in which the winding-end side is the positive direction may continue.

On the secondary side of the transformers 31 and 32, the following may therefore occur ((E) to (J), (Q), and (R) of FIG. 4). In accordance with reverse of the voltage applied to the primary winding 311 of the transformer 31, the output voltage V312 from the secondary winding 312 of the transformer 31 may also be reversed, and the output voltage V312 may be outputted so that a winding-end side of the secondary winding 312 is in the position direction. In addition, in accordance with the reverse of the voltage applied to the primary winding 311 of the transformer 31, the output voltages V332a and V332b may be outputted so that winding-end sides thereof are in the positive direction. It is to be noted that, in the primary winding 321 of the transformer 32, the output of the output voltage V322 which keeps the winding-end side in the positive direction may continue.

This may cause a flow of a loop current Il, instead of the loop currents Ig and Ih mentioned above, on the secondary side of the transformers 31 and 32, as illustrated in FIG. 8. The loop current Il may flow to circulate through the secondary winding 312, the secondary winding 322, the additional winding 332 (the additional windings 332a and 332b), the rectifying diode 431, the choke coil Lch, the output smoothing capacitor Cout, the rectifying diode 412, and the secondary winding 312 in the order named. In other words, at this occasion, the rectifying diodes 411 and 422 may each become nonconductive, while the rectifying diode 412 becomes conductive. In addition, the choke coil Lch may be excited by a potential difference (V312+V322+V332−Vout) between a sum of the output voltages V312, V322, and V332 from the transformers 31 and 32 and the additional winding 332, and the output voltage Vout.

As described, at the timing t4, a power transmission period from the primary side to the secondary side of the transformers 31 and 32 in the "serial connection state" (a serial connection mode) begins. In other words, at the timing t4, the secondary windings 312 and 322 and the additional winding 332 (the additional windings 332a and 332b) may be in a state where the secondary winding 312, and the secondary winding 322 as well as the additional winding 332 (the additional windings 332a and 332b), are coupled in series to one another (the four serial connection state). That is, at the timing t4, the serial connection state period ΔTs in the secondary windings 312 and 322 as well as the additional windings 332a and 332b may begin, as illustrated in FIG. 4. As described, a transition occurs from the parallel connection state period ΔTp (the electric power transmission period in the parallel connection mode: the timing t2 to the timing t3) to a transition period from the parallel connection state to the serial connection state (from the timing t2 to the timing t3), and then to the serial connection state period ΔTs (the electric power transmission period in the serial connection mode) at or after the timing t4 (from the timing t4 to the timing t5). It is to be noted that an occasion when the excitation begins to bring the winding-end side in the primary winding 311 of the transformer 31 to be in the positive direction as described above may correspond to the timing t4. The operation for the first half cycle may be then terminated (from the timing t0 to the timing t4).

(B-2. Operation for Latter Half Cycle)

Next, the operation for the latter half cycle (the timings t4 to t8 (=t0)) after the timings t0 to t4 illustrated in FIG. 4 is described.

The operation for the latter half cycle may be basically similar to the operation for the first half cycle (the timings t0 to t4) described with reference to FIGS. 5 to 8. As represented in parentheses in FIG. 4, the states at the timings t0, t1, t2, t3, and t4 may be equivalent to those at the timings t4, t5, t6, t7, and t8 (=t0), respectively (each may be equivalent to a state in which a phase is reversed by 180°). In the operation for the latter half cycle, the relation of the switching device S2 (the capacitor C2 and the diode D2) to the switching device S3 (the capacitor C3 and the diode D3) in the operation in the first half cycle may be replaced with the relation of the switching device S1 (the capacitor C1 and the diode D1) to the switching device S4 (the capacitor C4 and the diode D4).

Accordingly, description on details of the operation for the latter half cycle is omitted. Here ends the description on the series of operation illustrated in FIG. 4.

(C. Workings and Effects)

As described, the switching power supply unit 1 according to the present embodiment may have the circuit configuration as illustrated in FIGS. 1 to 3, and may perform the operation as illustrated in FIGS. 4 to 8. Hence, it is possible to obtain workings and effects as follows.

First, the driving circuit 5 may perform the switching drive to cause the two half-bridge circuits 21 and 22 to operate with the phase difference φ. The driving circuit 5 may control magnitude of the output voltage Vout, by performing the switching drive to switch the connection state of the windings including the secondary windings 312 and 322 included in the two transformers 31 and 32 (to switch at a predetermined time ratio). To be more specific, the driving circuit 5 may perform the switching drive to switch the connection state of the secondary winding 312, the secondary winding 322, and the additional winding 332 (the additional windings 332a and 332b).

Here, such controlling of the direct-current output voltage Vout by switching the connection state is specifically described with reference to diagrams such as circuit diagrams and schematic diagrams illustrated in FIG. 9, FIG. 10, (A) and (B) of FIG. 11, (A) and (B) of FIG. 12, and (A) and (B) of FIG. 13.

Figure 9:
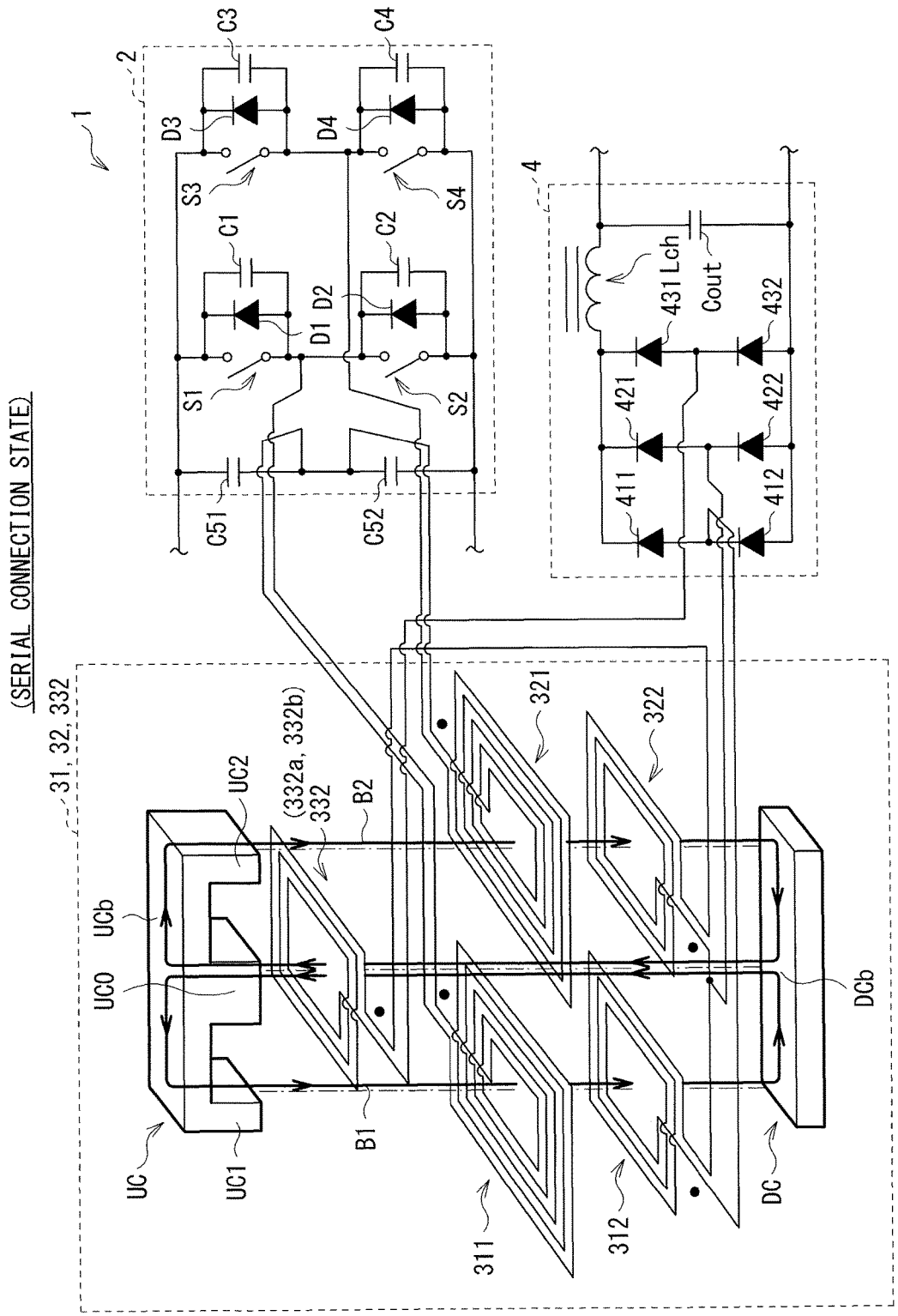
FIG. 9 is a schematic diagram for describing a magnetic path in a serial connection state.
Figure 10:
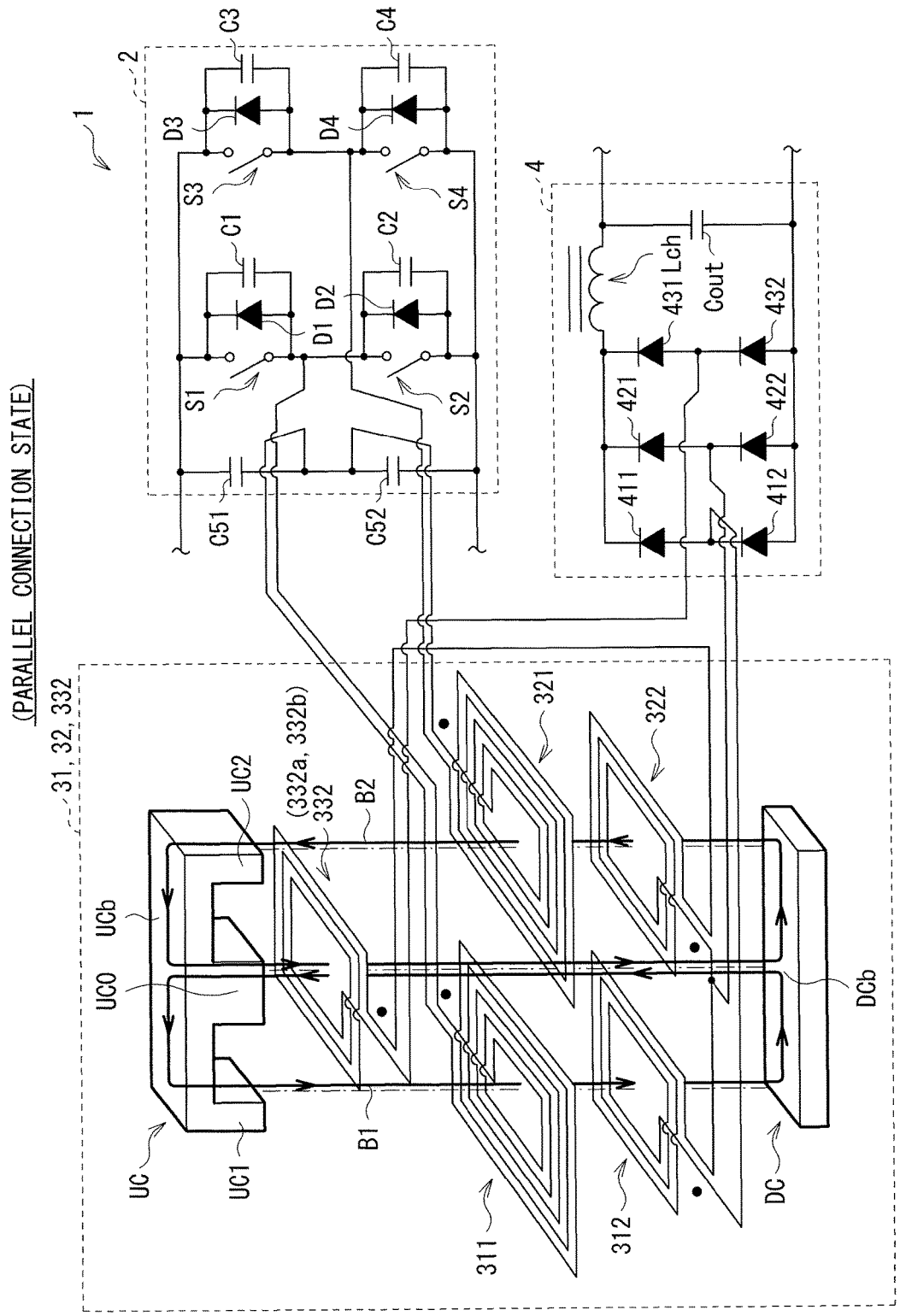
FIG. 10 is a schematic diagram for describing a magnetic path in a parallel connection state.
Figure 11:
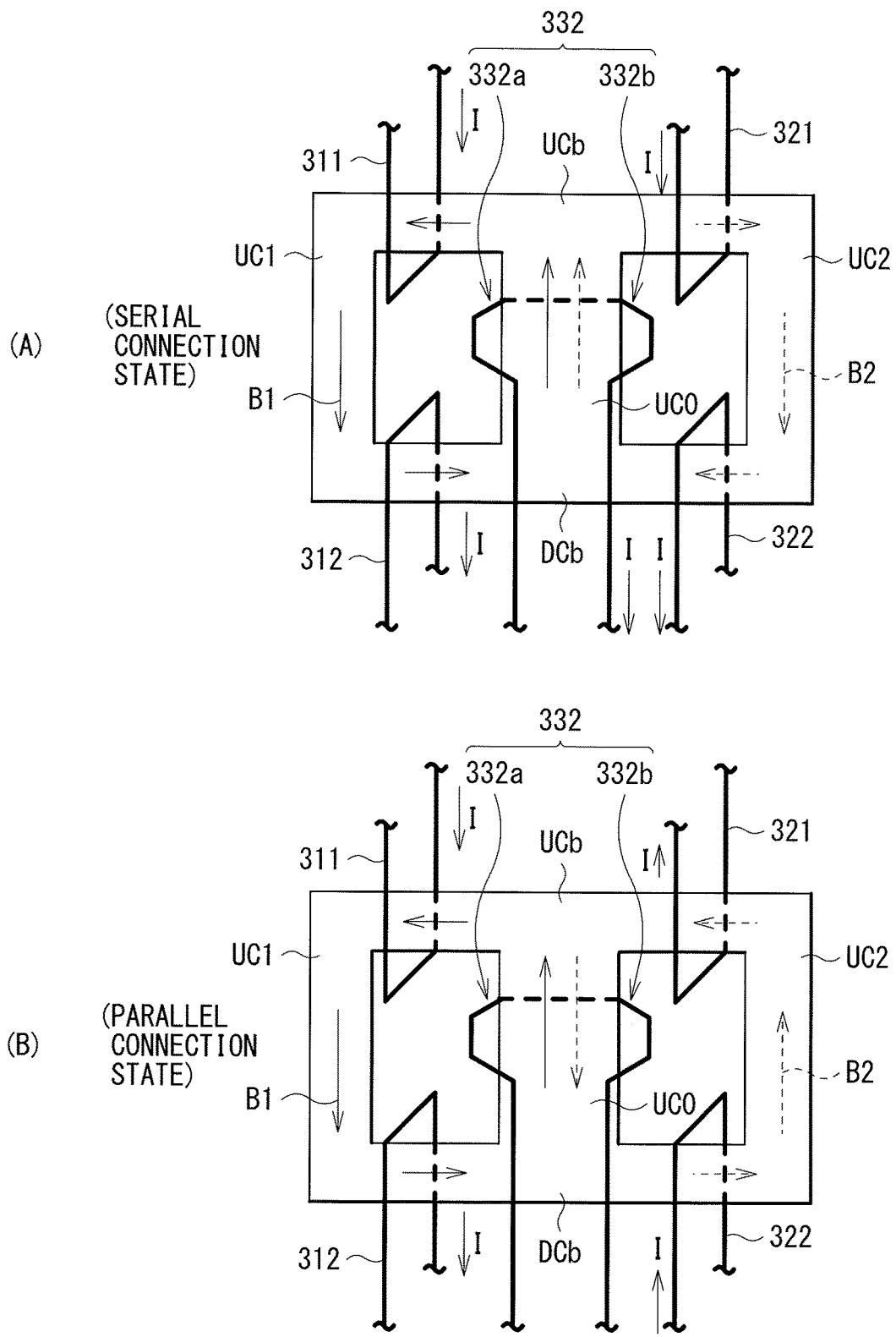
FIG. 11 is a schematic diagram of an example of an operation state in each of the serial connection state and the parallel connection state.
Figure 12:
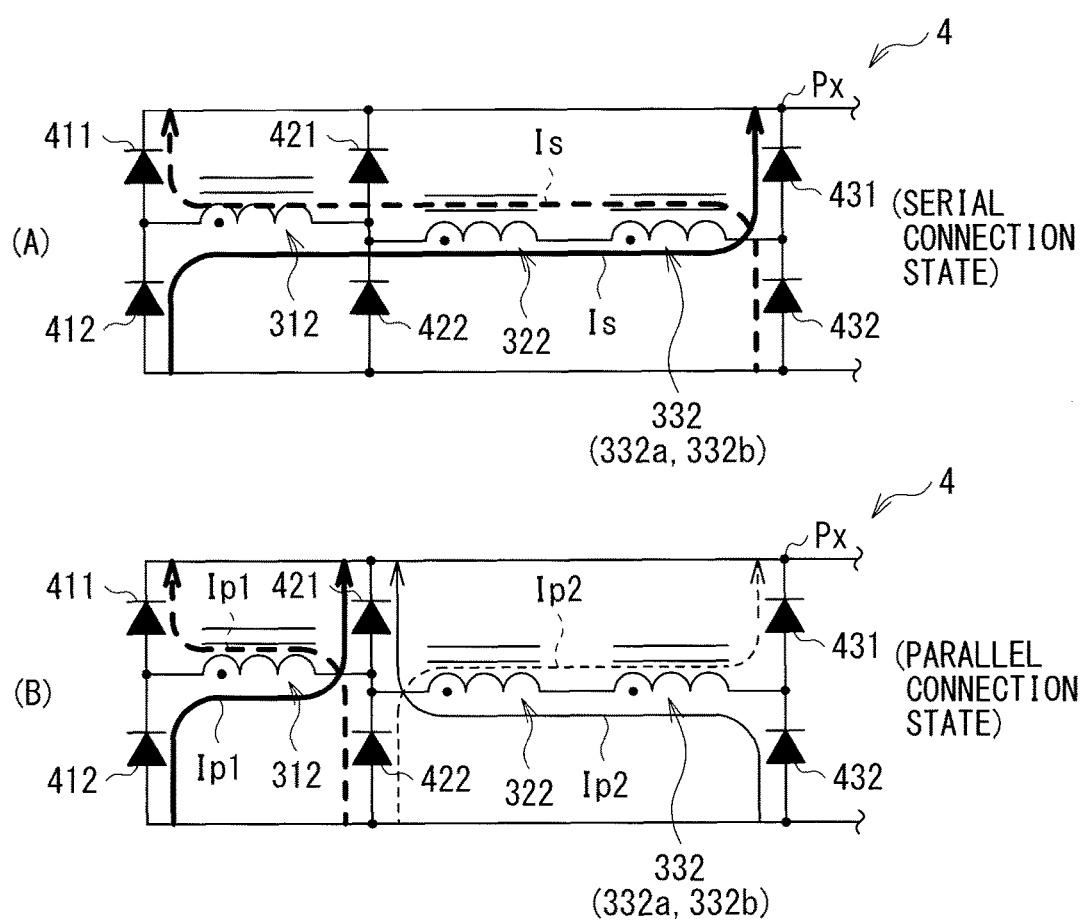
FIG. 12 is a circuit diagram of an example of an operation state in each of the serial connection state and the parallel connection state.

In the present embodiment, the driving circuit 5 performs the switching drive for the switching circuit 2 (the half-bridge circuits 21 and 22) to switch the connection state of the secondary winding 312, the secondary winding 322, and the additional winding 332, between the four serial connection state (FIG. 9, (A) of FIG. 11, and (A) of FIG. 12) and the two parallel connection state (FIG. 10, (B) of FIG. 11, and (B) of FIG. 12). In other words, the switching between the four serial connection state and the two parallel connection state may be performed according to whether the two transformers 31 and 32 are in phase or out of phase.

Here, in the four serial connection state, first, the magnetic paths (loop magnetic paths) B1 and B2 of magnetic flux in directions illustrated in FIG. 9 may be formed, and each of the currents I may flow in a direction illustrated in (A) of FIG. 11, in the transformers 31 and 32 and the additional winding 332. Specifically, the magnetic path B1 may be a path running through the base core UCb, the leg (outer leg) UC1, the base core DCb, the leg (middle leg) UC0, and the base core UCb in the order named. The magnetic path B2 may be a path running through the base core UCb, the leg (outer leg) UC2, the base core DCb, the leg UC0, and the base core UCb in the order named. In other words, in the leg UC0, the magnetic flux in the magnetic path B1 and the magnetic flux in the magnetic path B2 may occur in respective directions to reinforce one another. It is to be noted that, as illustrated in FIG. 9 and (A) of FIG. 11, as described above, the additional winding 332 may be disposed to be interlinked with each of the magnetic paths B1 and B2 formed in the transformers 31 and 32.

In addition, in the four serial connection state, as illustrated in (A) of FIG. 12, a current Is may serially flow in a direction indicated with a solid line or dashed line, in each of the secondary windings 312 and 322, and the additional winding 332. Specifically, referring to the configuration of the rectifying smoothing circuit 4 illustrated in FIG. 1, the current Is indicated with the solid line may flow through the rectifying diode 412, the secondary winding 312, the secondary winding 322, the additional winding 332, and the rectifying diode 431 in the order named. The current Is indicated with the dashed line may flow through the rectifying diode 432, the additional winding 332, the secondary winding 322, the secondary winding 312, and the rectifying diode 411 in the order named.

Figure 13:
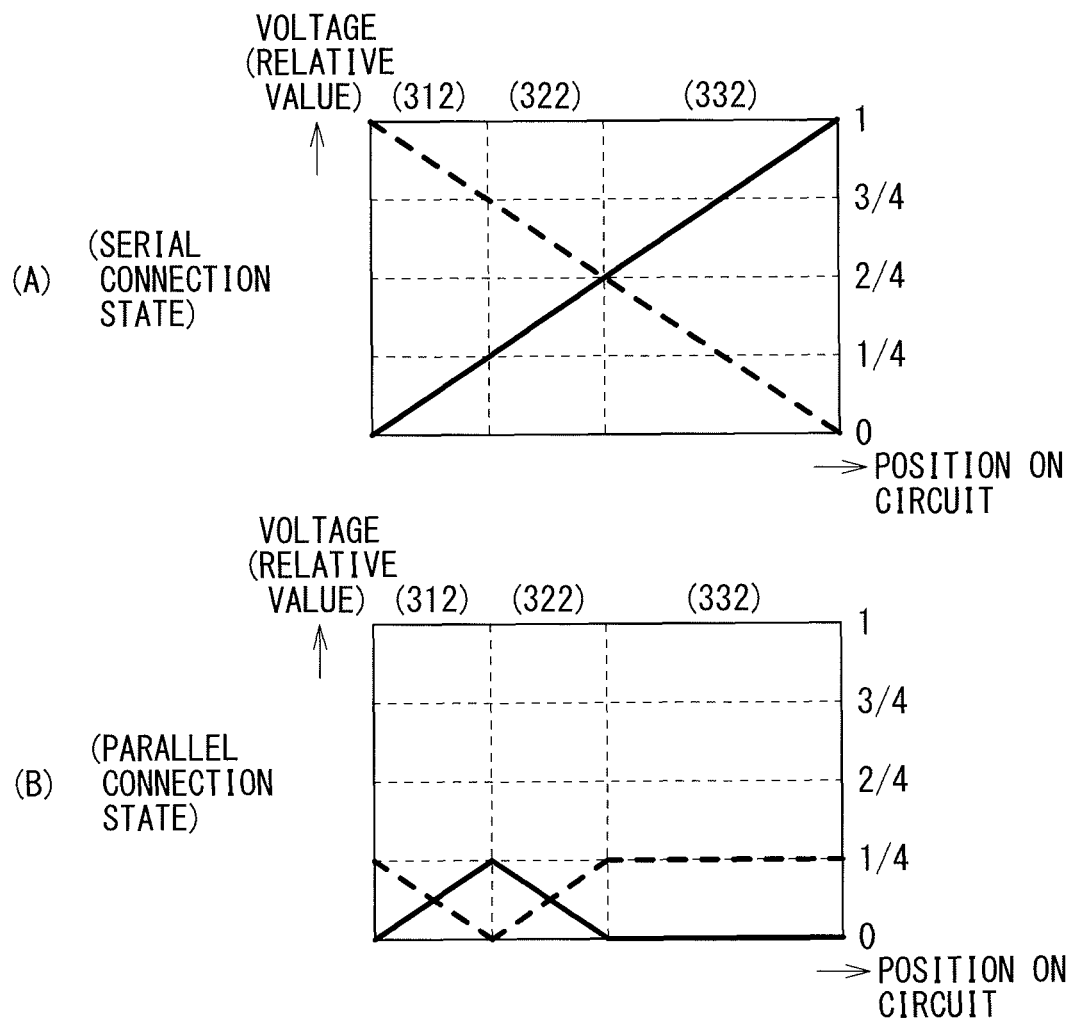
FIG. 13 is a diagram schematically illustrating the example of the operation states illustrated in FIG. 12.

In the four serial connection state, a position on the circuit in the rectifying smoothing circuit 4 may correspond to magnitude of a voltage, as schematically illustrated in (A) of FIG. 13, for example. It is to be noted that a graph indicated with a solid line in (A) of FIG. 13 corresponds to magnitude (a relative value) of a voltage in a flow of the current Is indicated with the solid line illustrated in (A) of FIG. 12. In addition, a graph indicated with a dashed line in (A) of FIG. 13 corresponds to magnitude of a voltage in a flow of the current Is indicated with the dashed line illustrated in (A) of FIG. 12. In the four serial connection state, the voltage linearly changes by the current Is, in a part corresponding to the secondary windings 312 and 322 and additional winding 332, as a whole.

On the other hand, in the two parallel connection state, first, in the transformers 31 and 32 and the additional winding 332, the magnetic paths (loop magnetic paths) B1 and B2 of magnetic flux in directions illustrated in FIG. 10 may be formed, and each of the currents I may flow in a direction illustrated in (B) of FIG. 11. Specifically, the magnetic path B1 may be a path running through the base core UCb, the leg UC1, the base core DCb, the leg UC0, and the base core UCb in the order named. The magnetic path B2 may be a path running through the base core UCb, the leg UC0, the base core DCb, the leg UC2, and the base core UCb in the order named. In other words, as compared with the case (the four serial connection state) illustrated in FIG. 9, the magnetic flux in the magnetic path B2 may be reversed, causing the magnetic flux in the magnetic path B1 and the magnetic flux in the magnetic path B2 to occur in respective directions to offset one another, in the leg UC0. It is to be noted that, as illustrated in FIG. 10 and (B) of FIG. 11 as well, as described above, the additional winding 332 may be disposed to be interlinked with each of the magnetic paths B1 and B2 formed in the transformers 31 and 32.

Furthermore, in the two parallel connection state, as illustrated in (B) of FIG. 12, currents Ip1 and Ip2 may flow in parallel to one another in a direction indicated with a solid line or dashed line in a combination, in each of the secondary windings 312 and 322 and the additional winding 332. Specifically, referring to the configuration of the rectifying smoothing circuit 4 illustrated in FIG. 1, the current Ip1 indicated with the solid line may flow through the rectifying diode 412, the secondary winding 312, and the rectifying diode 421 in the order named. In addition, the current Ip1 indicated with the dashed line may flow through the rectifying diode 422, the secondary winding 312, and the rectifying diode 411 in the order named. Similarly, the current Ip2 indicated with the solid line may flow through the rectifying diode 432, the additional winding 332, the secondary winding 322, and the rectifying diode 421 in the order named. In addition, the current Ip2 indicated with the dashed line may flow through the rectifying diode 422, the secondary winding 322, the additional winding 332, and the rectifying diode 431 in the order named. It is to be noted that, among the currents Ip1 and Ip2 each indicated with the solid line or dashed line, one indicated with a bold line (the secondary winding 312 side) represents a current of a relatively large amount (the bold line), and one indicated with a thin line (the secondary winding 322 and the additional winding 332 side) represents a current of a relatively small amount (the thin line).

In the two parallel connection state, a position on the circuit in the rectifying smoothing circuit 4 may correspond to magnitude of a voltage, as schematically illustrated in (B) of FIG. 13, for example. It is to be noted that a graph indicated with a solid line in (B) of FIG. 13 corresponds to magnitude (a relative value) of a voltage in a flow of the current Ip1 indicated with the solid line illustrated in (B) of FIG. 12. In addition, a graph indicated with a dashed line in (B) of FIG. 13 corresponds to magnitude of a voltage in a flow of the current Ip2 indicated with the dashed line illustrated in (B) of FIG. 12. In the two parallel connection state, the voltage linearly changes by the currents Ip1 and Ip2, in a part corresponding to the secondary windings 312 and 322, as a whole. In a part corresponding to the additional winding 332 (the additional windings 332a and 332b), the magnetic flux in the magnetic path B1 and the magnetic flux in the magnetic path B2 offset one another, as described above, which causes a voltage between both ends to become 0 V.

Here, as illustrated in FIGS. 2 and 4, the switching drive may be performed, with a phase difference of 180°, on the two switching devices S1 and S2 in the half-bridge circuit 21. The switching drive may be performed, with a phase difference of 180°, on the two switching devices S3 and S4 in the half-bridge circuit 22 as well. In addition, as described, the two half-bridge circuits 21 and 22 may also be driven to operate with the phase difference φ, for example, as illustrated in FIG. 4.

Controlling the phase difference φ, therefore, makes it possible to change a time ratio (duty) between the four serial connection state and the two parallel connection state mentioned above. This allows for adjustment of the magnitude of the direct-current output voltage Vout. Specifically, increasing the phase difference φ may be equivalent to increasing a superposition period of the drive signals SG1 and SG4, and increasing a superposition period of the drive signals SG2 and SG3. In other words, increasing the phase difference φ may be equivalent to increasing the serial connection state period ΔTs illustrated in FIG. 4.

Moreover, in the present embodiment, for example, the driving circuit 5 may perform the switching drive to cause durations of the on-duty periods of the switching devices S1 to S4 to be substantially maximum (or to be maximum in a preferred but non-limiting example), in the half-bridge circuits 21 and 22.

Here, as described above, in an off-duty period in which no power transmission by the transformers 31 and 32 is performed, generation of a circulating current (e.g., the loop currents Ie, If, Ij, and Ik) with use of the LC resonance operation may achieve the ZVS operation when the switching device is turned on. However, the circulating current necessary for the ZVS operation exists in the off-duty period. This may increase a loss in electrical power as the off-duty period becomes longer, resulting in reduction in power conversion efficiency.

In the present embodiment, as described, in the half-bridge circuits 21 and 22, the switching drive may be performed to cause durations of the on-duty periods of the switching devices S1 to S4 to be substantially a maximum. This allows the off-duty periods to be limited to a short time, i.e., the above-described dead time (e.g., the period from the timing t1 to the timing t2, the period from the timing t3 to the timing t4, the period from the timing t5 to the timing t6, and the period from the timing t7 to the timing t8). Hence, it is possible to minimize generation of the circulating current necessary for the ZVS operation. Consequently, a power loss due to the circulating current flowing through the body diodes (the diodes D1 to D4) of the switching devices S1 to S4 may also be minimized, leading to enhancement in power conversion efficiency. It is to be noted that, in a preferred but non-limiting example, the durations of the on-duty periods of the switching devices S1 to S4 may be substantially maximum in order to reduce the power loss due to the circulating current; however, the operation is not hindered even when the durations of the on-duty periods are not substantially maximum.

As described, in the present embodiment, the switching power supply unit 1 may have the circuit configuration as illustrated in FIGS. 1 to 3, and the operation as illustrated in FIGS. 4 to 8 may be performed. Hence, it is possible to minimize the generation of the circulating current necessary for the ZVS operation. This results in reduction in a conduction loss that does not contribute to power transmission in the switching devices S1 to S4, making it possible to facilitate enhancement in power transmission efficiency.

The reduction in the loss also makes it possible to use a device having a smaller rating, allowing for reduction in costs. Furthermore, the reduction in the loss causes reduction in heat generation in the switching devices S1 to S4. Hence, it is possible to relieve requests for performance of a heat dissipation insulating plate necessary to attain both heat dissipation and insulation. In this viewpoint as well, it is possible to reduce costs.

In addition, in the present embodiment, the output voltage from the transformers 31 and 32 (e.g., corresponding to the voltage VPx illustrated in (R) of FIG. 4) has a stepwise waveform with two stages. For this reason, amplitude of ringing generated in each of the rectifying diodes 411, 412, 421, 422, 431, and 432 in the rectifying smoothing circuit 4 becomes small, as compared with a typical phase-shift full bridge converter. Since the ringing generated in each of the rectifying diodes thus becomes small, it is possible to use a lower withstand voltage device. Using the lower withstand voltage device makes it possible to reduce costs and reduce a loss in each of the rectifying diodes as well.

Moreover, the circuit configuration of the switching circuit 2 and the rectifying smoothing circuit 4 of the present embodiment may have, for example, the following advantages, as compared with a circuit configuration in which three half-bridge circuits are disposed in parallel in a switching circuit and eight rectifying diodes are provided in a rectifying smoothing circuit (four arms are disposed in parallel) (i.e., a so-called "triple half-bridge circuit"). In the switching circuit 2 and the rectifying smoothing circuit 4 of the present embodiment, it is possible to ensure the voltage range (the voltage range in the voltage conversion from the direct-current input voltage Vin to the direct-current output voltage Vout) equivalent to that in the "triple half-bridge circuit", by using fewer devices. Specifically, in the present embodiment, it is possible to achieve a voltage range equivalent to that in the "triple half-bridge circuit", while reducing the number of switching devices from six to four, and reducing the number of rectifying diodes from eight to six.

Furthermore, the present embodiment has the following advantage, as compared with a circuit configuration in which two half-bridge circuits are disposed in parallel in a switching circuit and six rectifying diodes are provided in a rectifying smoothing circuit (three arms are disposed in parallel) (i.e., a so-called "dual half-bridge circuit"). In other words, in the switching circuit 2 and the rectifying smoothing circuit 4 of the present embodiment, it is possible to further widen the voltage range in the voltage conversion from the direct-current input voltage Vin to the direct-current output voltage Vout, even though the number of devices (the four switching devices, two transformer, and the six rectifying diodes) is equal to that in the "triple half-bridge circuit".

It is to be noted that, in the present embodiment, the configuration in which the winding (the additional winding 332) is added to the secondary side of the transformer is provided as compared with the case of the "dual half-bridge circuit". However, since the side to which the additional winding 332 is added is the secondary side, in spite of addition of the additional winding 332, influence on effects such as saving of space may be minute, as compared with a case in which the number of windings on the primary side is increased.

[2. Modification Examples]

Next, modification examples (modification examples 1 to 5) of the forgoing embodiment are described. It is to be noted that, in the following modification examples, similar components to those of the present embodiment are denoted by similar references, and description thereof is omitted.

MODIFICATION EXAMPLE 1

(A. Configuration)

Figure 14:
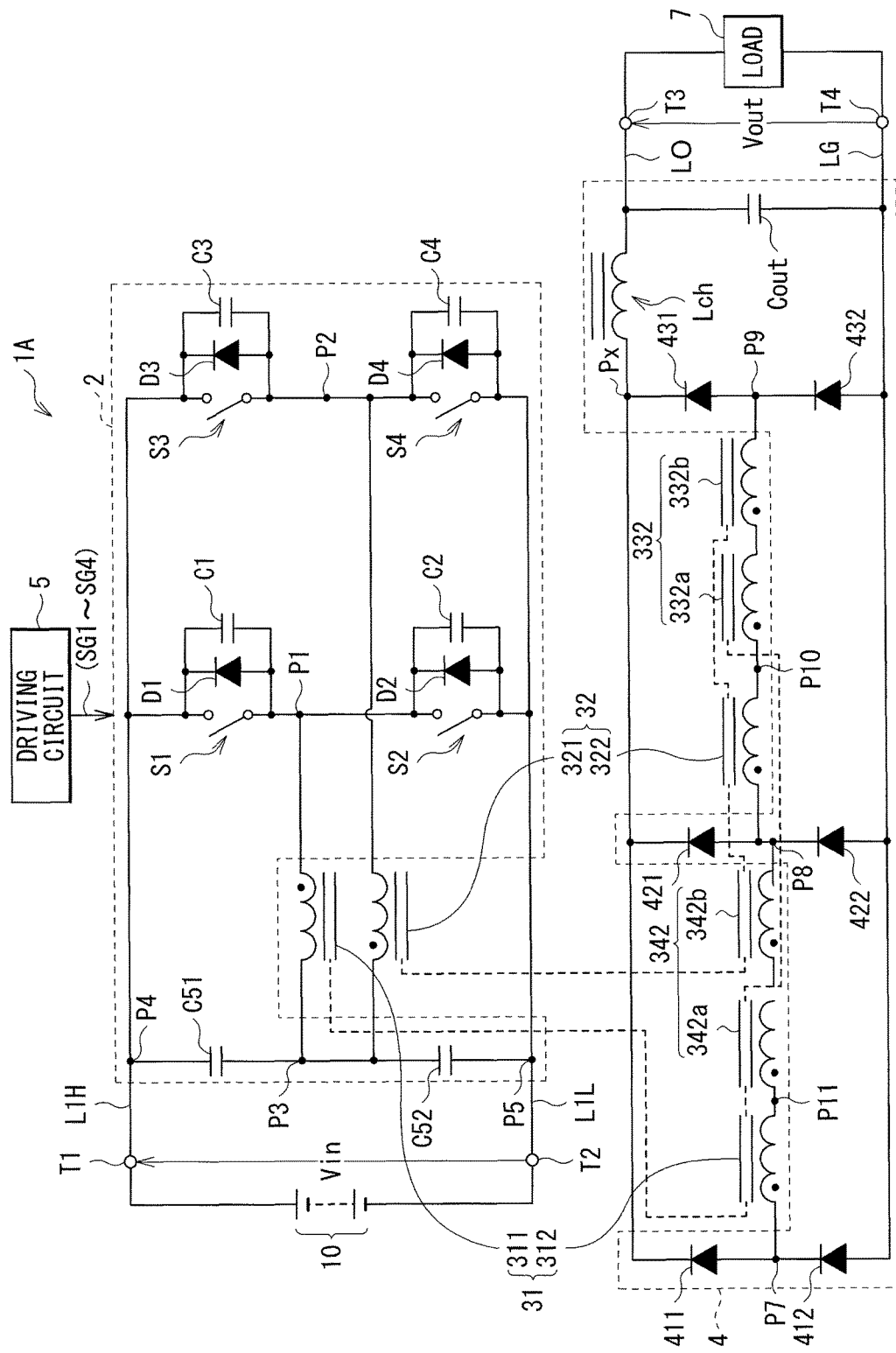
FIG. 14 is a circuit diagram of an example of an overall configuration of a switching power supply unit according to a modification example 1.

FIG. 14 illustrates, in a form of a circuit diagram, an example of an overall configuration of a switching power supply unit (a switching power supply unit 1A) according to a modification example 1.

The switching power supply unit 1A of the present modification example may correspond to the switching power supply unit 1 of the embodiment configured such that an additional winding is coupled in series to each of the two secondary windings 312 and 322. It is to be noted that other configurations are similar to those in the switching power supply unit 1.

Specifically, in the switching power supply unit 1A, the additional winding 332 may be coupled in series to the secondary winding 322 and an additional winding 342 may be coupled in series to the secondary winding 312. The additional windings 332 and 342 may each be disposed to be interlinked with each of the magnetic paths (the loop magnetic paths) formed in the transformers 31 and 32, as in the above-described embodiment.

The additional winding 332 may include the additional winding 332a and the additional winding 332b, on an equivalent circuit, as illustrated in FIG. 14. The additional winding 332a may be magnetically coupled to one (the secondary winding 312) of the secondary windings 312 and 322, whereas the additional winding 332b may be magnetically coupled to the other (the secondary winding 322). The additional windings 332a and 332b may be coupled in series to one another, thereby forming the entire additional winding 332. Moreover, in the additional winding 332, the additional winding 332a may be disposed on the secondary winding 322 side (the connection point P10 side), and the additional winding 332b may be disposed on the third arm side (the connection point P9 side).

Similarly, the additional winding 342 may include an additional winding 342a and an additional winding 342b, on the equivalent circuit, as illustrated in FIG. 14. The additional winding 342a may be magnetically coupled to one (the secondary winding 312) of the secondary windings 312 and 322, whereas the additional winding 342b may be magnetically coupled to the other (the secondary winding 322). The additional windings 342a and 342b may be coupled in series to one another, thereby forming the entire additional winding 342. Moreover, in the additional winding 342, the additional winding 342a may be disposed on the secondary winding 312 side (the connection point P11 side), and the additional winding 342b may be disposed on the second arm side (the connection point P8 side).

It is to be noted that, of the additional windings 342a and 342b, the additional winding 342a corresponds to one specific but non-limiting example of a "first additional winding" of one embodiment of the technology, and the additional winding 342b corresponds to one specific but non-limiting example of a "second additional winding" of one embodiment of the technology.

(B. Operation, Workings, and Effects)

The switching power supply unit 1A may basically operate in a manner similar to the switching power supply unit 1. Hence, basically, it is possible to obtain similar workings and thereby obtain similar effects, in the present modification example as well.

In addition, as described above in the present modification example in particular, the additional winding (the additional windings 332 and 342) may be coupled in series to each of the two secondary windings 312 and 322.

Figure 15:
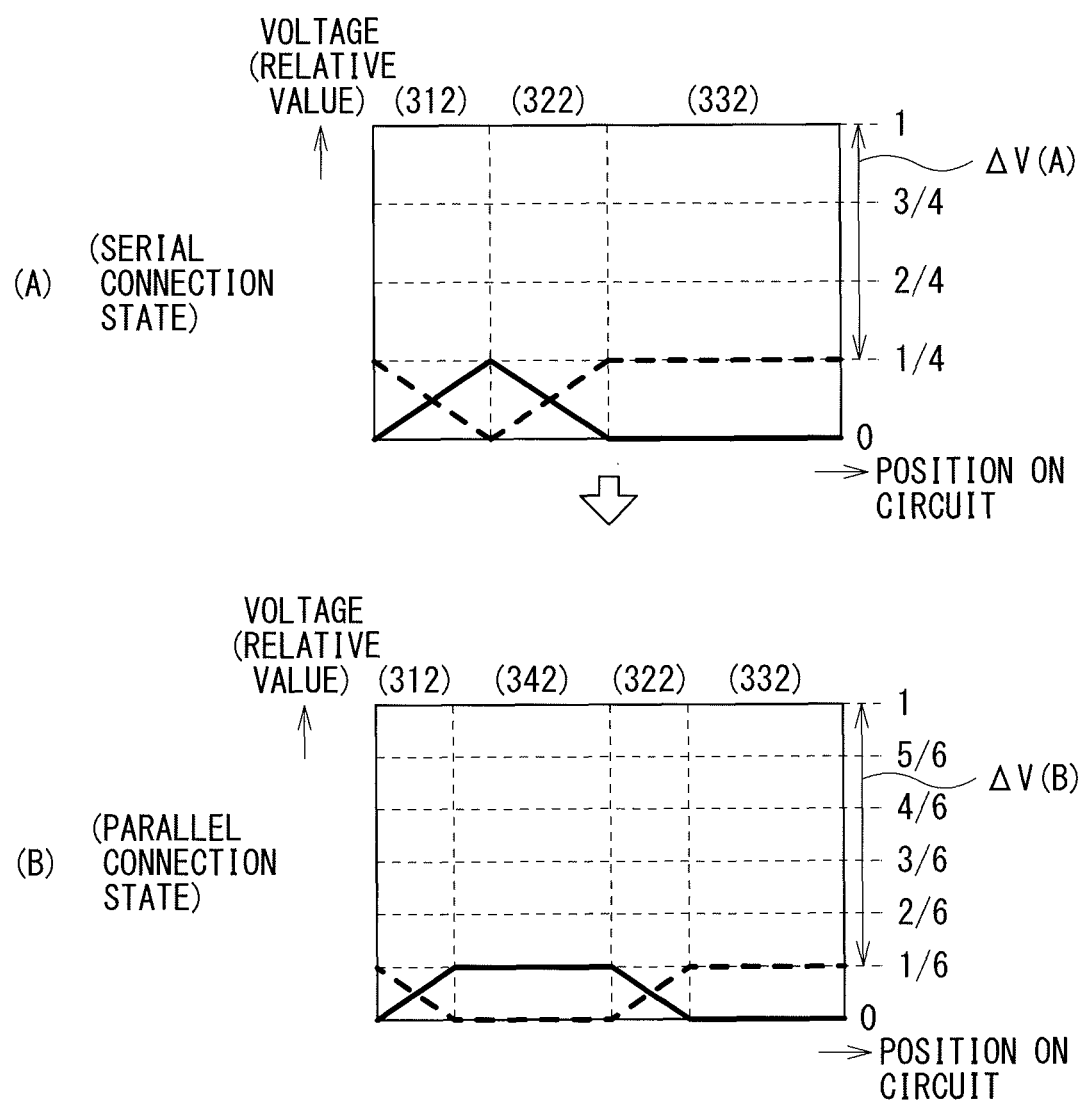
FIG. 15 is a diagram schematically illustrating an example of an operation state in a rectifying smoothing circuit illustrated in FIG. 14.

Hence, in the present modification example, referring to the schematic diagram illustrated in each of (A) and (B) of FIG. 15, an example is as follows. It is to be noted that (A) of FIG. 15 illustrates an example of a correspondence between a position on the circuit in the rectifying smoothing circuit 4 and magnitude of a voltage, in the parallel connection state (the two parallel connection state) described above in the embodiment. Further, (B) of FIG. 15 illustrates a correspondence between a position on the circuit in the rectifying smoothing circuit 4 and magnitude of a voltage, in the parallel connection state (the two parallel connection state) in the present modification example.

In a comparison of the parallel connection state of the above-described embodiment illustrated in (A) of FIG. 15 and the parallel connection state of the present modification example illustrated in (B) of FIG. 15, influence of the additional winding in the rectifying smoothing circuit 4 in the present modification example, in which the additional winding 342 is further provided, may be larger than that in the above-described embodiment. As a result, in the present modification example, the difference (the voltage difference) between the magnitude (a relative value) of the voltage in the serial connection state (see (A) of FIG. 13) and the magnitude (a relative value) of the voltage that in the parallel connection state may be large, as compared with the embodiment. In addition, a voltage range (an output voltage range or an input voltage range) in the voltage conversion from the direct-current input voltage Vin to the direct-current output voltage Vout may be wide, as compared with the embodiment. Specifically, the voltage difference (a voltage difference $\Delta V$ (B)) in the example of (B) of FIG. 15 may be larger than the voltage difference (a voltage difference $\Delta V$ (A)) in the example of (A) of FIG. 15 ($\Delta V$ (B)>$\Delta V$ (A)). It is therefore possible to widen the voltage difference in the example of (B) of FIG. 15, as compared with the voltage difference in the example of (A) of FIG. 15.

As described, in the present modification example, it is possible to widen the voltage range, in the voltage conversion from the direct-current input voltage Vin to the direct-current output voltage Vout, as compared with the above-described embodiment.

MODIFICATION EXAMPLE 2

(A. Configuration)

Figure 16:
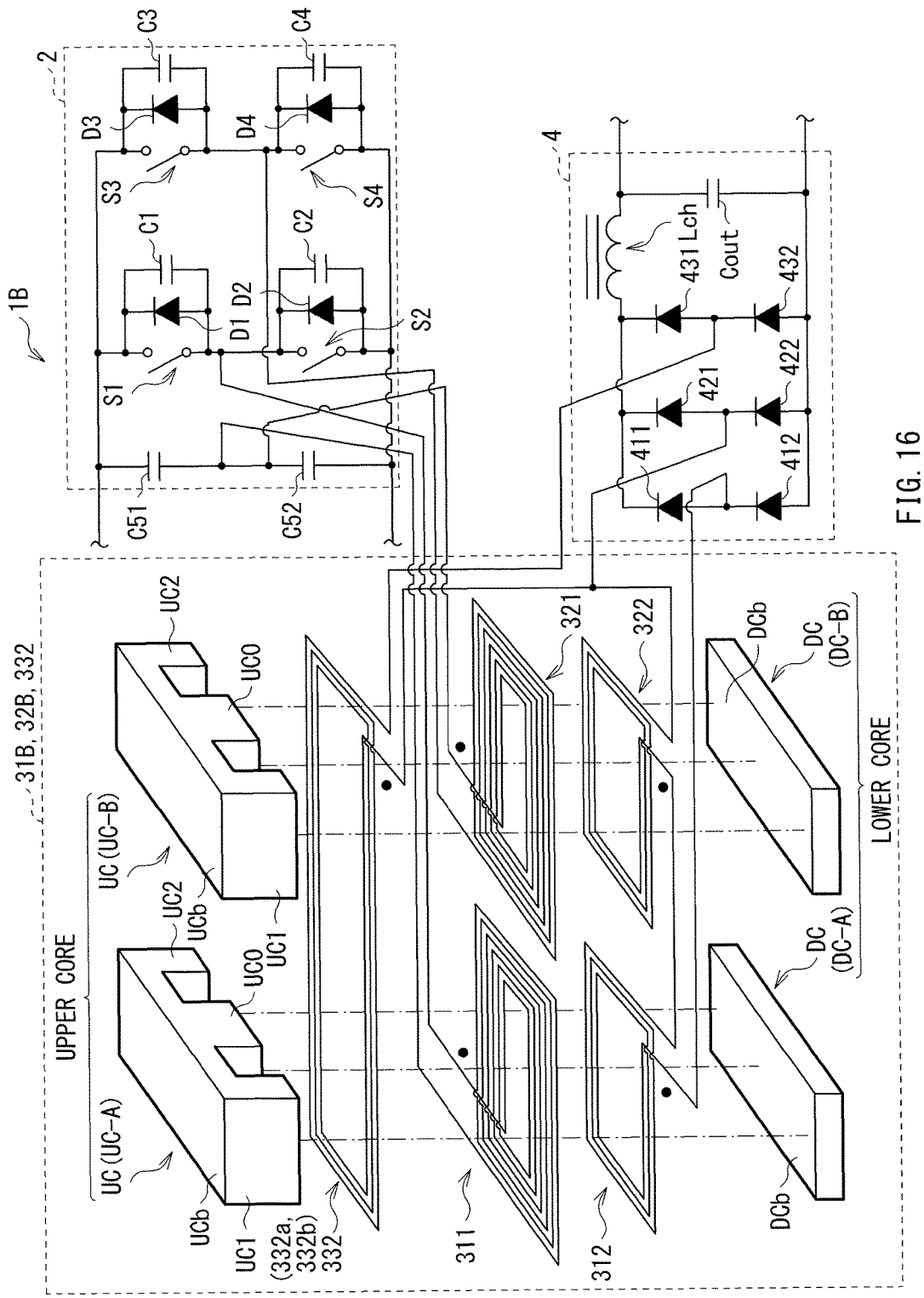
FIG. 16 is a schematic diagram of an example of an overall configuration of a switching power supply unit according to a modification example 2.

FIG. 16 schematically illustrates, in a form of a circuit diagram and an exploded perspective view, an example of an overall configuration of a switching power supply unit (a switching power supply unit 1B) according to a modification example 2.

The switching power supply unit 1B according to the present modification example may be provided with transformers 31B and 32B, instead of the transformers 31 and 32 in the switching power supply unit 1 of the present embodiment, respectively. It is to be noted that other configurations have similar configurations as those in the switching power supply unit 1.

Specifically, in the switching power supply unit 1B, the transformers 31B and 32B may be included in two EI cores (a plurality of magnetic devices) mentioned above. To be more specific, the plurality of (two) magnetic devices may each include a magnetic core including the upper core UC (UC-A) and the lower core DC (DC-A), or a magnetic core including the upper core UC (UC-B) and the lower core DC (DC-B).

Furthermore, in the present modification example, unlike the above-described embodiment, the windings (the primary windings 311 and 321, the secondary windings 312 and 322, and the additional winding 332) may be selectively wound around the leg (middle leg) UC0 among the legs UC0, UC1, and UC2 in these two magnetic cores. Specifically, in this example, the primary winding 311 and the secondary winding 312 may each be selectively wound around the leg UC0 in the upper core UC-A. In addition, the primary winding 321 and the secondary winding 322 may each be selectively wound around the leg UC0 in the upper core UC-B. Moreover, the additional winding 332 (the additional windings 332a and 332b) may be wound around both of the leg UC0 in the upper core UC-A and the leg UC0 in the upper core UC-B. In the transformers 31B and 32B as well, the additional winding 332 may therefore be disposed to be interlinked with each of the magnetic paths (the loop magnetic paths) formed in the transformers 31B and 32B, as with the transformers 31 and 32.

(B. Operation, Workings, and Effects)

The switching power supply unit 1B may basically operate in a manner similar to the switching power supply unit 1. Hence, basically, it is possible to obtain similar workings and thereby obtain similar effects, in the present modification example as well.

In particular, in the present modification example, as described above, the windings (the primary windings 311 and 321, the secondary windings 312 and 322, and the additional winding 332) may be selectively wound around the leg (the middle leg) UC0 in the magnetic core of each of the transformers 31B and 32B.

It is therefore possible, in the present modification example, to achieve saving of space in the transformers 31B an 32B as a whole, and to thereby realize downsizing in the switching power supply unit 1B as a whole, when each of the windings is configured of, for example, the above-mentioned printed coil or sheet metal.

MODIFICATION EXAMPLE 3

Figure 17:
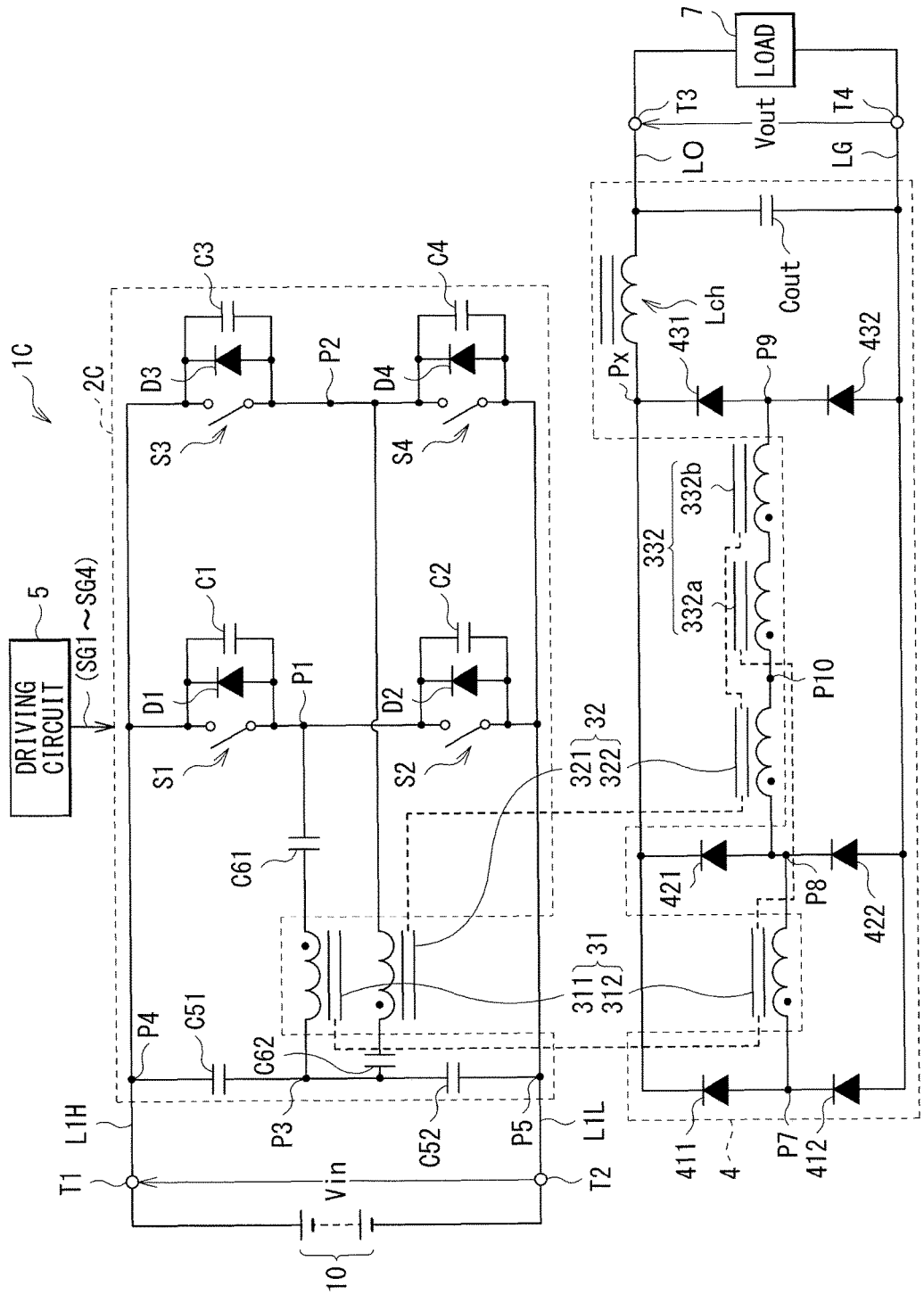
FIG. 17 is a circuit diagram of an example of an overall configuration of a switching power supply unit according to a modification example 3.

FIG. 17 illustrates, in a form of a circuit diagram, an example of an overall configuration of a switching power supply unit (a switching power supply unit 1C) according to a modification example 3.

The switching power supply unit 1C may be provided with a switching circuit 2C as described below, instead of the switching circuit 2 in the switching power supply unit 1 according to the forgoing embodiment.

The switching circuit 2C may be provided with capacitors that prevents biased excitation, i.e., capacitors C61 and C62. Specifically, the capacitor C61 may be inserted between the connection point P1 and the primary winding 311 of the transformer 31. The capacitor C62 may be inserted between the connection point P3 and the primary winding 321 of the transformer 32.

With this configuration, in the switching power supply unit 1C, it is possible to restrain (or prevent in a preferred but non-limiting example) biased excitation in the transformers 31 and 32, and to avoid various inconveniences due to the biased excitation.

It is to be noted that the switching power supply units 1A and 1B described in the modification examples 1 and 2, respectively, may also be provided with the capacitors C61 and C62 similarly to the present modification example.

MODIFICATION EXAMPLE 4

Figure 18:
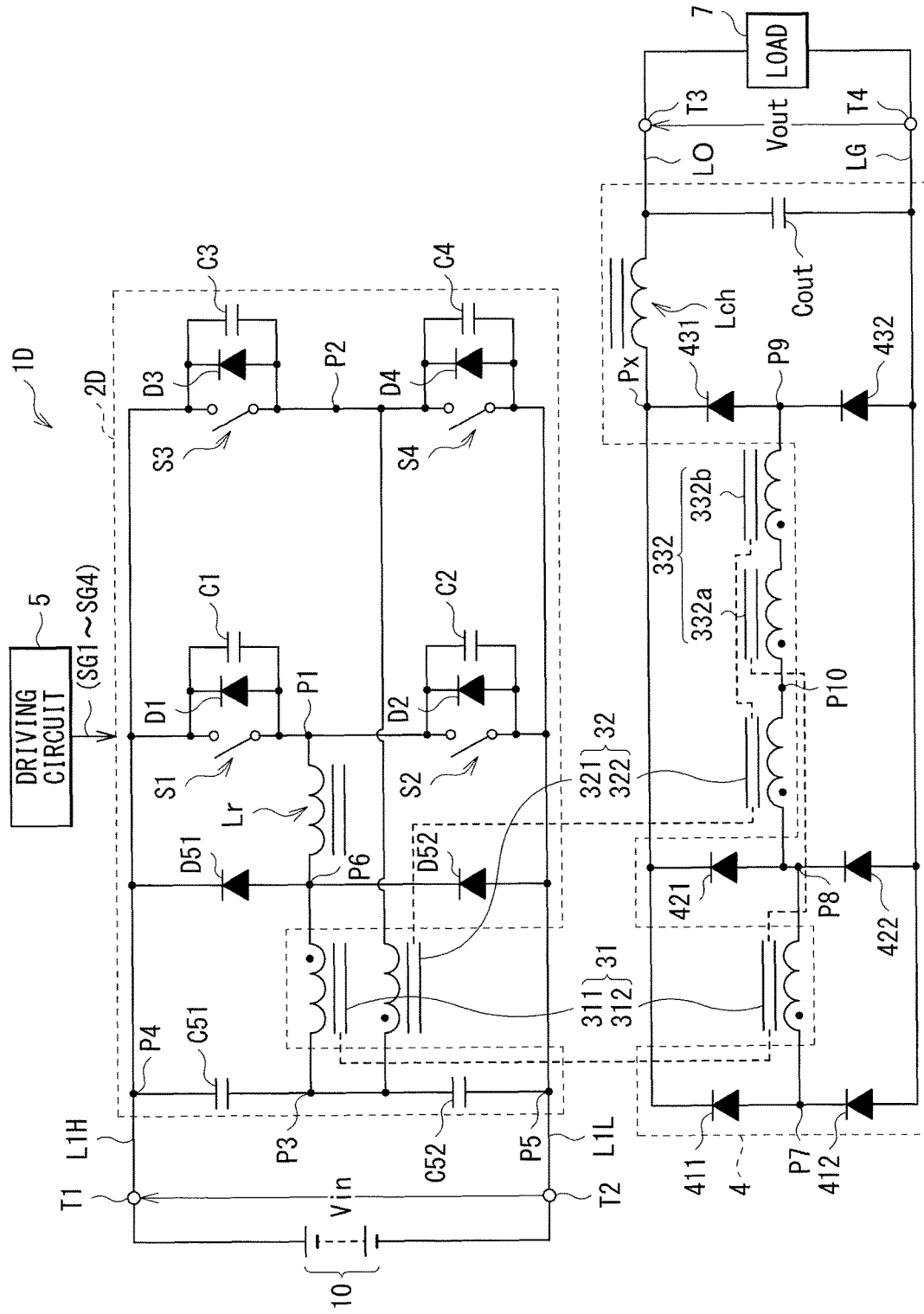
FIG. 18 is a circuit diagram of an example of an overall configuration of a switching power supply unit according to a modification example 4.

FIG. 18 illustrates, in a form of a circuit diagram, an example of an overall configuration of a switching power supply unit (a switching power supply unit 1D) according to a modification example 4.

The switching power supply unit 1D may be provided with a switching circuit 2D as described below, instead of the switching circuit 2 in the switching power supply unit 1 according to the forgoing embodiment.

The switching circuit 2D may be provided with rectifying devices that may serve as reverse voltage clamps, i.e., diodes D51 and D52. Specifically, the diode D51 may include an anode coupled to the connection point P6 (the connection point located between the primary winding 311 and the connection point P1), and a cathode coupled to the primary high-voltage line L1H (the connection point P4). The diode D52 may include an anode coupled to the primary low-voltage line L1L (the connection point P5), and a cathode coupled to the connection point P6. In other words, the diodes D51 and D52 may be provided between the primary high-voltage line L1H and the primary low-voltage line L1L, and may be coupled in series to one another through the connection point P6. Furthermore, in the switching circuit 2D, a resonance inductor Lr may be disposed between the connection point P1 and the connection point P6.

With this configuration, in the switching power supply unit 1D, it is possible to restrain generation of a surge voltage accompanying the on and off operation of each of the switching devices S1 to S4. Hence, it is possible to reduce the loss in the rectifying diodes 411, 412, 421, 422, 431, and 432 inside the rectifying smoothing circuit 4.

It is to be noted that the switching power supply units 1A, 1B, and 1C described in the modification examples 1 to 3, respectively, may be also provided with the diodes D51 and D52 that may serve as reverse voltage clamps, and the resonance inductor Lr, similarly to the present modification example.

MODIFICATION EXAMPLE 5

Figure 19:
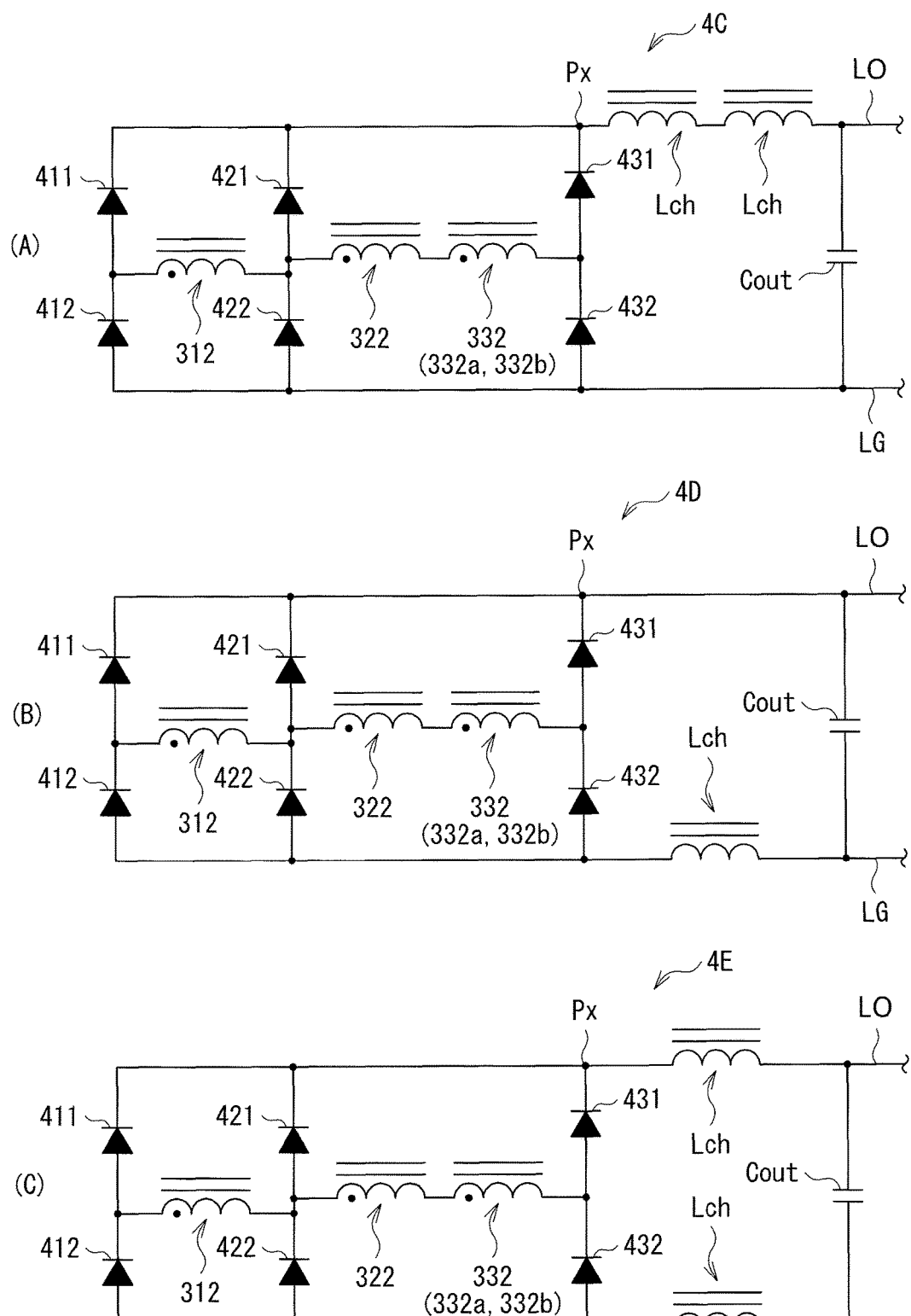
FIG. 19 is a circuit diagram of an example of a configuration of a rectifying smoothing circuit according to a modification example 5.

(A) to (C) of FIG. 19 each illustrate an example of a circuit configuration of each of rectifying smoothing circuits (rectifying smoothing circuits 4C, 4D, and 4E) according to a modification example 5. Specifically, (A) of FIG. 19 illustrates the circuit configuration of the rectifying smoothing circuit 4C, (B) of FIG. 19 illustrates the circuit configuration of the rectifying smoothing circuit 4D, and (C) of FIG. 19 illustrates the circuit configuration of the rectifying smoothing circuit 4E. It is to be noted that these (A) to (C) of FIG. 19 each illustrate the two additional windings 332a and 332b collectively as the additional winding 332 for convenience.

The rectifying smoothing circuits 4C, 4D, and 4E according to the present modification example may be different from the rectifying smoothing circuit 4 described so far, in terms of configuration (e.g., the number of devices and an arrangement of devices) of the choke coil Lch.

Specifically, in the rectifying smoothing circuit 4C illustrated in (A) of FIG. 19, the two choke coils Lch coupled in series to one another may be inserted between the connection point (the connection point Px) of the first ends in the first to third arms described above, and the first end of the output smoothing capacitor Cout, through the output line LO. In addition, the connection point of the second ends in the first to third arms may be coupled to the second end of the output smoothing capacitor Cout, on the ground line LG.

In the rectifying smoothing circuit 4D illustrated in (B) of FIG. 19, the one choke coil Lch may be inserted between the connection point of the second ends in the first to third arms, and the second end of the output smoothing capacitor Cout, through the ground line LG. Moreover, the connection point (the connection point Px) of the first ends in the first to third arms may be coupled to the first end of the output smoothing capacitor Cout, on the output line LO.

In the rectifying smoothing circuit 4E illustrated in (C) of FIG. 19, the one choke coil Lch may be inserted between the connection point (the connection point Px) of the first ends in the first to third arms, and the first end of the output smoothing capacitor Cout, through the output line LO. In addition, the one choke coil Lch may be inserted between the connection point of the second ends in the first to third arms, and the second end of the output smoothing capacitor Cout, through the ground line LG. It is to be noted that, in the example illustrated in (C) of FIG. 19, two windings may be provided instead of the two choke coils Lch, and these two windings may magnetically coupled together to form the one choke coil Lch.

As described, a configuration (e.g., the number of devices and an arrangement of devices) inside the rectifying smoothing circuit may be modified in a variety of ways.

[3. Other Modification Examples]

Although the technology has been described in the foregoing by way of example with reference to the embodiment and the modification examples, the technology is not limited thereto but may be modified in a wide variety of ways.

For example, in the embodiment and the modification examples described above, description has been given on specific configurations of the switching circuits (the inverter circuit and the bridge circuit). However, the configurations of the switching circuits are not limited thereto, and other configurations may be adopted. Specifically, in the embodiment and the modification examples, described is the case in which each of the inverter circuits is the half-bridge circuit including the two switching devices, but each of the inverter circuits may be a full-bridge circuit including four switching devices, without being limited to this case. In addition, the configuration of each of the inverter circuits included in the switching power supply unit is not limited to such a common configuration. For example, one of the inverter circuits may be a half-bridge circuit including two switching devices, and the other of the inverter circuits may be a full-bridge circuit including four switching devices. In other words, the inverter circuits included in the switching power supply unit and having different configurations may be used. Furthermore, in the embodiment and the modification examples described above, using a leakage inductor of the transformer as a resonance inductor is described as an example, but a resonance inductor may be additionally provided in the switching circuit. Specifically, for example, such a resonance inductor may be disposed between the phase-locked-side switching device or the phase-shift-side switching device and the primary winding. However, the position of the resonance inductor is not limited thereto, and other position may be adopted.

Moreover, in the embodiment and the modification examples, description has been given on specific configurations of the rectifying smoothing circuit. However, the configurations of the rectifying smoothing circuit are not limited thereto, and other configurations may be adopted. Specifically, for example, the rectifying devices in the rectifying smoothing circuit may each include a parasitic diode of a MOS-FET. In this case, in a preferred but non-limiting example, the MOS-FET itself may be turned on, in synchronization with a period in which the parasitic diode of the MOS-FET becomes conductive (that is, the MOS-FET may perform synchronous rectification). This allows for rectification with a smaller voltage drop. It is to be noted that, in this case, anode side of the parasitic diode may be disposed on source side of the MOS-FET, while cathode side of the parasitic diode may be disposed on drain side of the MOS-FET.

Furthermore, in the rectifying smoothing circuit, for example, the positions of the secondary winding 322 and the additional winding 332 coupled in series to one another may be reversed. In other words, the additional winding 332 may be disposed on the second arm (the rectifying diodes 421 and 422) side, and the secondary winding 322 may be disposed on the third arm (the rectifying diodes 431 and 432) side. In addition, in the rectifying smoothing circuit, for example, the first arm and the secondary winding 312 may be disposed on the opposite side (the choke coil Lch side), relative to the positions of the second arm, the secondary winding 322, and the additional winding 332. In other words, the first arm (the rectifying diodes 411 and 412) and the secondary winding 312 may be disposed between the third arm (the rectifying diodes 431 and 432) and the choke coil Lch. In the embodiment and the modification examples described above, the number of the inverter circuits (the bridge circuits), the number of the transformers, the number of the rectifying devices, and the number of the arms are not limited to physical numbers, but may refer to the numbers of those present in an equivalent circuit.

In addition, in the embodiment and the modification examples described above, the configurations of components such as the magnetic cores and the windings in the magnetic devices of the transformers are described using specific examples. However, other configurations may be adopted as these configurations, without being limited to the specific examples in the embodiment and the modification examples described above. Specifically, for example, the magnetic core may include one or a plurality of cores (e.g., a so-called UI core) of other shape, instead of the one or plurality of EI cores as described in the embodiment and the modification examples. In addition, the magnetic core is not limited to the magnetic core having the middle leg and the outer legs as described in the embodiment and the modification examples, and a magnetic core having other shape may be used. Furthermore, techniques of winding the windings around the various magnetic cores are not limited to those described in the embodiment and the modification examples, and other winding techniques may be adopted.

Moreover, in the embodiment and the modification examples described above, the case where each of the number of the inverter circuits and the number of the transformers is two (the case where the number of the rectifying devices in the rectifying smoothing circuit is six) is described as an example. However, the numbers of these components are not limited to those in this case. Specifically, the technology is applicable to a case where each of the number of the inverter circuits and the number of the transformers is N (N: an integer of 2 or greater). In other words, the technology is applicable not only to the case of N=2 described in the embodiment and the modification examples described above, but also to a case of any number where N<3 (an even number or an odd number) similarly. It is to be noted, in that case, the number of the rectifying devices in the rectifying smoothing circuit may be $\{2\times(N+1)\}$, and the number of the arms in the rectifying smoothing circuit may be (N+1). In addition, in that case, the types of the connection state between the secondary windings of the transformer in the operation of the switching power supply device may be determined by the number of submultiples (a combination of submultiples) of the integer N.

Furthermore, in the embodiment and the modification examples described above, description has been given on an example of a DC-DC converter as an example of the switching power supply unit according to the embodiment. However, the technology may be applied to other types of switching power supply unit such as an AC-DC converter.

Moreover, the technology encompasses any possible combination of some or all of the examples such as the various configuration examples described herein.

It should be understood by those skilled in the art that various modifications, combinations, sub-combinations and alterations may occur depending on design requirements and other factors insofar as they are within the scope of the appended claims or the equivalents thereof.

It is possible to achieve at least the following configurations from the above-described example embodiments of the technology.

(1) A switching power supply unit, including:

a pair of input terminals that receives an input voltage;

a pair of output terminals that outputs an output voltage;

an N-number of transformers each having a primary winding and a secondary winding, where N is an integer of 2 or greater;

an N-number of inverter circuits each including a switching device, and disposed in parallel to one another between the primary winding and the pair of input terminals;

a rectifying smoothing circuit including a $\{2\times(N+1)\}$-number of rectifying devices, a choke coil, and a capacitor disposed between the pair of output terminals, the rectifying smoothing circuit being disposed between the secondary winding and the pair of output terminals;

an additional winding disposed to be interlinked with each of magnetic paths formed in the N-number of transformers; and a driver that performs a switching drive to control operation of the switching devices in the N-number of inverter circuits, wherein in the rectifying smoothing circuit, a (N+1)-number of arms each have two of the rectifying devices disposed in series to one another in a same direction, and are disposed in parallel to one another between the pair of output terminals, the secondary winding in each of the N-number of transformers is coupled between adjacent ones of the (N+1)-number of arms to individually form an H-bridge coupling, and the additional winding is coupled in series to one or more of the secondary windings in the N-number of transformers, and the choke coil is disposed between the (N+1)-number of arms and the capacitor.

(2) The switching power supply unit according to (1), wherein N is 2.

(3) The switching power supply unit according to (2), wherein the additional winding is coupled in series to the secondary windings of the respective two transformers.

(4) The switching power supply unit according to (2) or (3), wherein the additional winding includes a first additional winding magnetically coupled to a first one of the secondary windings of the respective two transformers, and a second additional winding magnetically coupled to a second one of the secondary windings of the respective two transformers.

(5) The switching power supply unit according to any one of (2) to (4), wherein the two transformers are included in a single magnetic device, the single magnetic device includes a magnetic core, the magnetic core having a middle leg and a plurality of outer legs that each form a loop magnetic path with the middle leg while sharing the middle leg, and the primary windings and the secondary windings of the respective two transformers, and the additional winding are each wound around the magnetic core.

(6) The switching power supply unit according to any one of (2) to (4), wherein the two transformers are included in a plurality of magnetic devices, the plurality of magnetic devices each include a magnetic core, the magnetic core having a middle leg and a plurality of outer legs, and the primary windings and the secondary windings of the respective two transformers, and the additional winding are each selectively wound around the middle leg.

(7) The switching power supply unit according to any one of (1) to (6), wherein the driver controls magnitude of the output voltage, by performing the switching drive to switch a connection state between the secondary windings of the respective N-number of transformers.

(8) The switching power supply unit according to (7), wherein the driver performs the switching drive to switch the connection state between the secondary windings of the respective N-number of transformers, between a serial connection state and a parallel connection state.

(9) The switching power supply unit according to any one of (1) to (8), wherein the driver performs the switching drive to cause the N-number of inverter circuits to operate with a phase difference.

(10) The switching power supply unit according to (9), wherein the driver performs the switching drive to cause a duration of an on-duty period of the switching device to be substantially a maximum, in each of the N-number of inverter circuits.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A switching power supply unit, comprising:
a pair of input terminals that receives an input voltage;
a pair of output terminals that outputs an output voltage;
an N-number of transformers each having a primary winding and a secondary winding, where N is an integer of 2 or greater;
an N-number of inverter circuits each including a switching device, and disposed in parallel to one another, the N-number of inverter circuits being disposed between the primary windings and the pair of input terminals;
a rectifying smoothing circuit including a $\{2\times(N+1)\}$-number of rectifying devices, a choke coil, and a capacitor disposed between the pair of output terminals, the rectifying smoothing circuit being disposed between the secondary winding and the pair of output terminals;
an additional winding disposed to be interlinked with each of magnetic paths formed in the N-number of transformers; and
a driver that performs a switching drive to control operation of the switching devices in the N-number of inverter circuits, wherein
in the rectifying smoothing circuit,
a (N +1)-number of arms each have two of the rectifying devices disposed in series to one another in a same direction, and are disposed in parallel to one another between the pair of output terminals,
the secondary winding in each of the N-number of transformers is coupled between adjacent ones of the (N +1)-number of arms to individually form an H-bridge coupling, and the additional winding is coupled in series to one or more of the secondary windings in the N-number of transformers, and
the choke coil is disposed between the (N +1)-number of arms and the capacitor.

2. The switching power supply unit according to claim 1, wherein N is 2.

3. The switching power supply unit according to claim 2, wherein the additional winding is coupled in series to the secondary windings of the respective two transformers.

4. The switching power supply unit according to claim 2, wherein the additional winding includes
a first additional winding magnetically coupled to a first one of the secondary windings of the respective two transformers, and
a second additional winding magnetically coupled to a second one of the secondary windings of the respective two transformers.

5. The switching power supply unit according to claim 2, wherein
the two transformers are included in a single magnetic device, the single magnetic device includes a magnetic core, the magnetic core having a middle leg and a plurality of outer legs that each form a loop magnetic path with the middle leg while sharing the middle leg, and the primary windings and the secondary windings of the respective two transformers, and the additional winding are each wound around the magnetic core.

6. The switching power supply unit according to claim 2, wherein the two transformers are included in a plurality of magnetic devices, the plurality of magnetic devices each include a magnetic core, the magnetic core having a middle leg and a plurality of outer legs, and the primary windings and the secondary windings of the respective two transformers, and the additional winding are each selectively wound around the middle leg.

7. The switching power supply unit according to claim 1, wherein the driver controls magnitude of the output voltage, by performing the switching drive to switch a connection state between the secondary windings of the respective N-number of transformers.

8. The switching power supply unit according to claim 7, wherein the driver performs the switching drive to switch the connection state between the secondary windings of the respective N-number of transformers, between a serial connection state and a parallel connection state.

9. The switching power supply unit according to claim 1, wherein the driver performs the switching drive to cause the N-number of inverter circuits to operate with a phase difference.

10. The switching power supply unit according to claim 9, wherein the driver performs the switching drive to cause a duration of an on-duty period of the switching device to be substantially a maximum, in each of the N-number of inverter circuits.

* * * * *